(12) United States Patent
Mikami

(10) Patent No.: US 7,725,776 B2
(45) Date of Patent: May 25, 2010

(54) METHOD FOR DISPLAYING PAIR STATE OF COPY PAIRS

(75) Inventor: Shogo Mikami, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 731 days.

(21) Appl. No.: 11/431,711

(22) Filed: May 11, 2006

(65) Prior Publication Data

US 2007/0220322 A1    Sep. 20, 2007

(30) Foreign Application Priority Data

Mar. 15, 2006    (JP) .............................. 2006-070181

(51) Int. Cl.
*G06F 00/11* (2006.01)
*G06F 13/00* (2006.01)

(52) U.S. Cl. ................. 714/46; 714/4; 714/6; 710/104; 711/114

(58) Field of Classification Search ..................... 714/4; 710/104; 711/114
See application file for complete search history.

(56) References Cited

U.S. PATENT DOCUMENTS

| | | | |
|---|---|---|---|
| 6,173,377 B1 * | 1/2001 | Yanai et al. .................. | 711/162 |
| 6,654,862 B2 * | 11/2003 | Morris ........................ | 711/162 |
| 6,976,140 B2 * | 12/2005 | Satoyama et al. ........... | 711/161 |
| 2003/0079156 A1 * | 4/2003 | Sicola et al. ..................... | 714/4 |
| 2003/0158869 A1 * | 8/2003 | Micka ......................... | 707/203 |
| 2003/0221074 A1 * | 11/2003 | Satoyama et al. ........... | 711/162 |
| 2004/0107315 A1 * | 6/2004 | Watanabe et al. ........... | 711/114 |
| 2005/0066128 A1 * | 3/2005 | Yagisawa et al. ............ | 711/114 |
| 2006/0095700 A1 * | 5/2006 | Sato et al. .................... | 711/165 |
| 2006/0101214 A1 * | 5/2006 | Mikami ...................... | 711/162 |
| 2006/0117157 A1 * | 6/2006 | Kitamura .................... | 711/163 |
| 2006/0129608 A1 * | 6/2006 | Sato et al. .................... | 707/200 |
| 2006/0136633 A1 * | 6/2006 | Harima et al. ............... | 710/104 |
| 2006/0150001 A1 * | 7/2006 | Eguchi et al. .................. | 714/6 |
| 2006/0212667 A1 * | 9/2006 | Mikami ...................... | 711/162 |

FOREIGN PATENT DOCUMENTS

JP    2004-264973    9/2004

* cited by examiner

*Primary Examiner*—Michael C Maskulinski
*Assistant Examiner*—Jeison C Arcos
(74) *Attorney, Agent, or Firm*—Antonelli, Terry, Stout & Kraus, LLP.

(57) ABSTRACT

The present invention is to provide a method for displaying a copy pair in which a distinction can be made between change of pair state performed intentionally by a user and change of pair state performed not intentionally by the user. When a backup instruction for PVOL is transmitted from the task server to the storage subsystem, the subsystem records, on a table, backup execution condition information including an ID of a copy pair having the PVOL. The monitoring program acquires the pair state of each copy pair and the backup execution condition information from the subsystem, and displays the pair state of the copy pair having the ID contained in the backup execution condition information, and the pair state of other copy pair, in different display modes.

10 Claims, 18 Drawing Sheets

| Pair ID | P-VOLID:S-VOLID | Status | ..... |
|---|---|---|---|
| 01 | 01:02 | Resync | ..... |
| 02 | 11:12 | Sync | ..... |
| ⋮ | ⋮ | ⋮ | ⋮ |

| Object List | | | | | | | | |
|---|---|---|---|---|---|---|---|---|
| Copy Group ▲ | Copy Type | | | | | Paired Information | | |
| | SI | TCA | TCS | QS | UR | Pair management Server | IP Address | Part |
| ◇ G_DF600_SI | ☑ sync | ▫ | ▫ | ▫ | ▫ | stdg14 | 10.208.118.60 | 50200 |
| ◇ G_DF600_TC | ▫ | ▫ | ☑ sync | ▫ | ▫ | stdg14 | 10.208.118.60 | 50200 |

| Object List | | |
|---|---|---|
| Pair Configurations | Copy Type | Copy Status |
| 🗄→[S] ... | TCS | split |
| ... [P]→[S] | SI | sync |

FIG. 11A

BACKUP/RESTORE EXECUTION CONDITION TABLE 77

| OPERATION TYPE | TARGET APPLICATION | START TIME | TARGET COPY PAIR |
|---|---|---|---|
| BACKUP | APPLICATION A | 2005/12/05 10:30:20 | Pair-D,Pair-E |

FIG. 11B

DISPLAY COPY PAIR STATE TABLE 67

| TARGET OF DISPLAY | PAIR STATE | DETAILED INFORMATION | | |
|---|---|---|---|---|
| | | COPY PAIR | STORAGE SUBSYSTEM | STATE UPDATE TIME |
| CG-A | NORMAL | | | |
| CG-B | WARNING | Pair-C | Array-A,Array-B | 2005/11/25 13:35:30 |
| CG-C | WARNING | Pair-E | Array-A | 2005/11/25 13:30:30 |
| POOL-A | ERROR | Pair-F | Array-D | 2005/11/25 13:40:30 |

FIG. 11C

PAIR STATE PRIORITY TABLE 69

| PRIORITY | | PAIR STATE FOR DISPLAY |
|---|---|---|
| PRIORITY "HIGH" | 1 | MAINTENANCE |
| | 2 | BACKUP/RESTORE BEING EXECUTED |
| | 3 | ERROR |
| | 4 | WARNING |
| PRIORITY "LOW" | 5 | NORMAL |

FIG. 12A

COPY PAIR STATE TABLE 65
(WHEN ACQUIRING LATEST INFORMATION)

| COPY PAIR | PAIR STATE | | CONFIGURATION INFORMATION | | | | | AGGREGATION SCOPE |
|---|---|---|---|---|---|---|---|---|
| | DETAILED | FOR DISPLAY | COPY GROUP | PORT | STORAGE SUBSYSTEM | COMMON RESOURCE | COPY TYPE | |
| Pair-A | Resync | UNCERTAIN | CG-A | CL1-A<br>CL1-A | Array-A,<br>Array-B | JNL-A | REMOTE | CG-A |
| Pair-B | Resync | UNCERTAIN | CG-A | CL1-A<br>CL1-A | Array-A,<br>Array-B | JNL-A | REMOTE | CG-A |
| Pair-C | Split | UNCERTAIN | CG-B | CL1-B<br>CL1-B | Array-A,<br>Array-B | NONE | REMOTE | CG-B |
| Pair-D | Split | UNCERTAIN | CG-C | CL1-C | Array-A | NONE | LOCAL | CG-C |
| Pair-E | Copying | UNCERTAIN | CG-C | CL1-C | Array-A | NONE | LOCAL | CG-C |
| Pair-F | Error | UNCERTAIN | CG-D | CL1-D | Array-D | POOL-A | LOCAL | CG-D |

FIG. 12B

COPY PAIR STATE TABLE 65
(MAINTENANCE WORK BEING EXECUTED ON ARRAY-A SUBSYSTEM)

| COPY PAIR | PAIR STATE | | CONFIGURATION INFORMATION | | | | | AGGREGATION SCOPE |
|---|---|---|---|---|---|---|---|---|
| | DETAILED | FOR DISPLAY | COPY GROUP | PORT | STORAGE SUBSYSTEM | COMMON RESOURCE | COPY TYPE | |
| Pair-A | Resync | MAINTENANCE | CG-A | CL1-A<br>CL1-A | Array-A,<br>Array-B | JNL-A | REMOTE | Array-A |
| Pair-B | Resync | MAINTENANCE | CG-A | CL1-A<br>CL1-A | Array-A,<br>Array-B | JNL-A | REMOTE | Array-A |
| Pair-C | Split | MAINTENANCE | CG-B | CL1-B<br>CL1-B | Array-A,<br>Array-B | NONE | REMOTE | Array-A |
| Pair-D | Split | MAINTENANCE | CG-C | CL1-C | Array-A | NONE | LOCAL | Array-A |
| Pair-E | Copying | MAINTENANCE | CG-C | CL1-C | Array-A | NONE | LOCAL | Array-A |
| Pair-F | Error | UNCERTAIN | CG-D | CL1-D | Array-D | POOL-A | LOCAL | CG-D |

FIG. 13A

COPY PAIR STATE TABLE 65
(BACKUP/RESTORATION BEING EXECUTED ON CG-C)

| COPY PAIR | PAIR STATE | | CONFIGURATION INFORMATION | | | | | AGGREGATION SCOPE |
|---|---|---|---|---|---|---|---|---|
| | DETAILED | FOR DISPLAY | COPY GROUP | PORT | STORAGE SUBSYSTEM | COMMON RESOURCE | COPY TYPE | |
| Pair-A | Resync | UNCERTAIN | CG-A | CL1-A | Array-A, | JNL-A | REMOTE | CG-A |
| | | | | CL1-A | Array-B | | | |
| Pair-B | Resync | UNCERTAIN | CG-A | CL1-A | Array-A, | JNL-A | REMOTE | CG-A |
| | | | | CL1-A | Array-B | | | |
| Pair-C | Split | UNCERTAIN | CG-B | CL1-B | Array-A, | NONE | REMOTE | CG-B |
| | | | | CL1-B | Array-B | | | |
| Pair-D | Split | BACKUP/ RESTORATION BEING EXECUTED | CG-C | CL1-C | Array-A | NONE | LOCAL | CG-C |
| Pair-E | Copying | BACKUP/ RESTORATION BEING EXECUTED | CG-C | CL1-C | Array-A | NONE | LOCAL | CG-C |
| Pair-F | Error | UNCERTAIN | CG-D | CL1-D | Array-D | POOL-A | LOCAL | CG-D |

FIG. 13B

COPY PAIR STATE TABLE 65
(AFTER IDENTIFYING "NORMAL", "WARNING", OR "ERROR")

| COPY PAIR | PAIR STATE | | CONFIGURATION INFORMATION | | | | | AGGREGATION SCOPE |
|---|---|---|---|---|---|---|---|---|
| | DETAILED | FOR DISPLAY | COPY GROUP | PORT | STORAGE SUBSYSTEM | COMMON RESOURCE | COPY TYPE | |
| Pair-A | Resync | NORMAL | CG-A | CL1-A | Array-A, | JNL-A | REMOTE | CG-A |
| | | | | CL1-A | Array-B | | | |
| Pair-B | Resync | NORMAL | CG-A | CL1-A | Array-A, | JNL-A | REMOTE | CG-A |
| | | | | CL1-A | Array-B | | | |
| Pair-C | Split | WARNING | CG-B | CL1-B | Array-A, | NONE | REMOTE | CG-B |
| | | | | CL1-B | Array-B | | | |
| Pair-D | Split | NORMAL | CG-C | CL1-C | Array-A | NONE | LOCAL | CG-C |
| Pair-E | Copying | WARNING | CG-C | CL1-C | Array-A | NONE | LOCAL | CG-C |
| Pair-F | Error | ERROR | CG-D | CL1-D | Array-D | POOL-A | LOCAL | CG-D |

FIG. 14A

COPY PAIR STATE TABLE 65
(THE VOLUME POOL CAPACITY BECOMES INADEQUATE IN POOL A)

| COPY PAIR | PAIR STATE | | CONFIGURATION INFORMATION | | | | | AGGREGATION SCOPE |
|---|---|---|---|---|---|---|---|---|
| | DETAILED | FOR DISPLAY | COPY GROUP | PORT | STORAGE SUBSYSTEM | COMMON RESOURCE | COPY TYPE | |
| Pair-A | Resync | NORMAL | CG-A | CL1-A | Array-A, | JNL-A | REMOTE | CG-A |
| | | | | CL1-A | Array-B | | | |
| Pair-B | Resync | NORMAL | CG-A | CL1-A | Array-A, | JNL-A | REMOTE | CG-A |
| | | | | CL1-A | Array-B | | | |
| Pair-C | Split | WARNING | CG-B | CL1-B | Array-A, | NONE | REMOTE | CG-B |
| | | | | CL1-B | Array-B | | | |
| Pair-D | Split | NORMAL | CG-C | CL1-C | Array-A | NONE | LOCAL | CG-C |
| Pair-E | Copying | WARNING | CG-C | CL1-C | Array-A | NONE | LOCAL | CG-C |
| Pair-F | Error | ERROR | CG-D | CL1-D | Array-D | POOL-A | LOCAL | POOL-A |

FIG. 14B

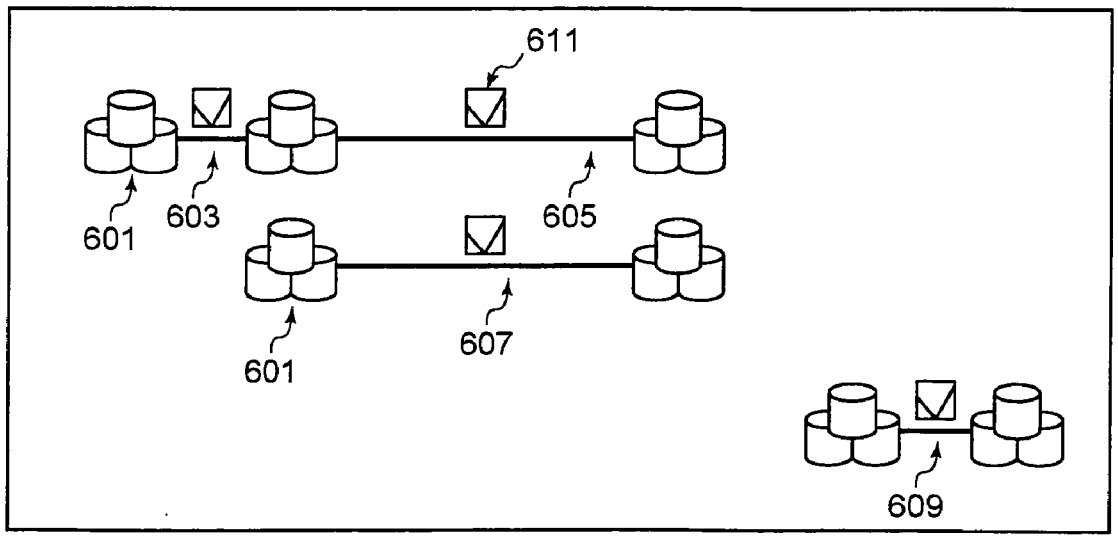

FIG. 17

| COPY PAIR | PVOL ID | SUBSYSTEM OF SVOL | SVOL ID | PAIR STATE | COPY GROUP | PORT | COMMON RESOURCE | COPY TYPE |
|---|---|---|---|---|---|---|---|---|
| Pair-A | 001 | Array-B | 001 | Resync | CG-A | CL1-A | JNL-A | REMOTE |
| Pair-B | 002 | Array-B | 002 | Resync | CG-A | CL1-A | JNL-A | REMOTE |
| Pair-C | 003 | Array-B | 003 | Split | CG-B | CL1-B | NONE | REMOTE |
| Pair-D | 004 | Array-A | 010 | Split | CG-C | CL1-C | NONE | LOCAL |
| Pair-E | 005 | Array-A | 012 | Copying | CG-C | CL1-C | NONE | LOCAL |

METHOD FOR DISPLAYING PAIR STATE OF COPY PAIRS

CROSS-REFERENCE TO PRIOR APPLICATION

This application relates to and claims priority from Japanese Patent Application No. 2006-70181, filed on Mar. 15, 2006 the entire disclosure of which is incorporated herein by reference.

BACKGROUND OF THE INVENTION

1. Field of the Invention

The present invention relates to a technology for displaying the pair state of a copy pair in one or a plurality of storage systems.

2. Description of the Related Art

For example, Japanese Patent Application Laid-Open No. 2004-264973 discloses a technology for copying data from a primary logical volume to a secondary logical volume which are paired. In to this patent application, the pair states of a plurality of volume pairs and the pair state of each volume pair are displayed in a list, as shown in FIG. 5.

Incidentally, a logical volume configuring a volume pair exists in one or a plurality of storage subsystems connected to a host computer. One logical volume and other logical volume may exist in a single storage subsystem or in separate storage subsystems.

As a configuration in which a plurality of volume pairs are used, the following configurations, for example, are possible. Specifically, possible are, for example, a configuration in which a copy group is obtained by synchronizing a plurality of volume pairs (see FIG. 1A), a configuration in which the primary logical volumes (referred to as "PVOL" hereinafter) of two volume pairs are the same (see FIG. 1B), and a configuration in which one secondary logical volume (referred to as "SVOL" hereinafter) and a PVOL are the same volume (see FIG. 1C).

In the case of such configurations of a copy group, even when employing a method of displaying the pair states of a plurality of volume pairs and the pair state of each volume pair in a list (see FIG. 2A, for example), a user viewing a screen displaying the list cannot understand whether the configuration using a plurality of volume pairs exists or not.

Therefore, as a method for solving such a problem, a method of displaying a pair state of an abstracted copy group, as shown in FIG. 2B, can be employed. In FIG. 2B, for example, at least one volume pair within a copy group, "G_DF600_SI", is in a pair state of "sync".

Furthermore, as another method, as shown in FIG. 2C, for example, a method of displaying a configuration of a plurality of volume pairs and a pair state of each volume pair can be employed. FIG. 2C shows a configuration of the example shown in FIG. 1C, and, as can be seen in the figure, the volume pair on the first row is in a pair state of "split" and the volume pair in the second row is in a pair state of "sync".

As yet another method, a method of combining the display methods of FIG. 2B and FIG. 2C can be employed. Specifically, for example, as shown in FIG. 2D, a method of displaying a configuration consisting of a plurality of copy groups (for example, copy groups specified by a user) and a pair state of each copy group on a screen can be employed. According to FIG. 2D, for example, the pair state of a first copy groups is "sync", the pair state of a second copy group is "split", and the pair state of a third copy group is "resync". According to FIG. 2D, each SVOL of the first copy group is integrated with each PVOL of the second copy group and of the third copy group.

However, even if any of the above-described methods is employed, at least the following three problems cannot be solved. Each of the problems is described hereinafter. It should be noted that a volume pair is referred to as "copy pair". Further, a pair state which is not intended by a user is referred to as "involuntary state", and, out of the involuntary pair states, an involuntary state which is required to be processed in any way (for example, a pair state which is changed due to detection of a hard error or soft error) is referred to as "error state".

(1) Change of pair state, which is performed intentionally by the user, cannot be distinguished from other changes of pair states.

For example, when a copy pair of local copies (local copy is performed inside a single storage subsystem) is used, a user sometimes has to intentionally change the pair state of the copy pair in order to acquire a backup of data. Normally, change of pair state performed intentionally by the user should be distinguished from change of a pair state which is performed involuntarily by the user due to some kind of problems.

However, in the above display method, although a pair state is displayed on a display screen, it is not possible to distinguish, only by looking, whether the pair state is the one which is changed by an operation performed intentionally by the user. For this reason, the user cannot determine whether the pair state displayed on the screen is an intended result or an involuntary state which is not an intended result, and consequently has to distinguish the presence of a problem by collating an execution condition of the operation performed by the user himself with the displayed information.

(2) In the case where a number of copy pairs are in the error state, the scope of the occurrence of the error state is difficult to be comprehended.

Sometimes thousands of copy pairs exist in a single storage subsystem. All of these copy pairs or some batches of copy pairs are sometimes brought into the error state simultaneously, depending on the type of failure. For example, suppose that, in the case where thousands of copy pairs of remote copies (remote copy is performed in the case where a PVOL exists in a storage subsystem and a SVOL exists in other storage subsystem) are used, a failure occurs in a communication medium (for example, a cable or a switch) between the storage subsystems. In this case, all of the copy pairs (that is, copy pairs containing logical volumes into or from which data is input or output via the ports) that use the ports connected to the communication medium are brought into the error state due to this failure.

However, in the above display method, although the user can understand that the numbers of copy pairs are brought into the error state, since the displayed pair states of the numbers of copy pairs are changed to the error state, the user cannot take a panoramic view of the entire scope of the occurrence of the error state because the pair states are displayed in a copy pair unit or a copy group unit. For this reason, the user has to comprehend the entire scope of the occurrence of the error state by confirming the all copy pairs brought into the error state. Moreover, when displaying a number of pair states on the display screen and concurrently updating these numbers of pair states to the error state, there is a problem that it requires a long time to perform rendering of the screen, which is associated with updating of the information.

(3) When it is uncertain whether the pair state is the error state or not, the detailed information required for making determination is difficult to be comprehended.

A state to be detected as a pair state is changed to not only a pair state due to the above mentioned hard error, but also to a pair state due to an erroneous operation performed by the user. The erroneous operation performed by the user is not a detectable hard error or soft error, thus even if a pair state is changed by the erroneous operation of the user, the pair state is not displayed as the error state.

In other words, in the above display method, the user needs to determine whether the changed pair state is in the error state or not. Specifically, for example, in order to determine whether or not the changed pair state is in a state which requires to be processed (i.e. error state), the user has to perform another operation for displaying necessary detailed information and refer to the detailed information displayed by the operation.

SUMMARY OF THE INVENTION

The present invention is contrived in view of the above problems, and an object thereof is to provide a copy pair display method in which a distinction can be made between change of pair state performed intentionally by a user and change of pair state performed involuntarily by the user.

Another object of the present invention is to provide a copy pair display method in which, when an error state occurs in a number of copy pairs simultaneously, the user can easily comprehend the scope of the occurrence of the error state.

Yet another object of the present invention will become apparent from the following description.

In a display method according to a first aspect of the present invention: a user request, which is a request complying with an intentional operation performed on a host computer by a user, is transmitted to a storage system by the host computer; the storage system which receives the user request records on a storage region (memory, for example) thereof user operation information, which is information related to the user request, and changes, in copy pair management information in which is recorded, for each copy pair, a subsystem pair state which is a pair state in the storage system, a subsystem pair state of a copy pair related to the user request to a subsystem pair state accompanied with the user request; using the user operation information and the copy pair management information after update, a distinction is made between a user-operated copy pair, which is in the subsystem pair state changed in accompany with the user request complying with user operation performed intentionally by the user, and a user-unoperated copy pair which is not in the subsystem pair state; and, on the basis of a result of the distinction, a pair state for display of the user-operated copy pair and a pair state for display of the user-unoperated copy pair are displayed in different display modes respectively.

In a first embodiment, the user operation may be a backup/restore operation for backing up or restoring data inside a logical volume in which data used by the host computer is stored.

In the second embodiment according to the first embodiment, the user request may be a backup/restore request complying with the backup/restore operation. The user operation information is information indicating that backup or restoration is being executed for a copy pair complying with the backup/restore request, and may be stored in the storage region while the backup or restoration is being executed.

In a third embodiment, the user operation may be a subsystem state operation for bringing a storage system state desired by the user to a state desired by the user. The user operation information may be subsystem state information which indicates that the storage system is brought into a state complying with the user request.

In a fourth embodiment according to the third embodiment, the user operation further includes a backup/restore operation for backing up or restoring data inside a logical volume in which data used by the host computer is stored, and, in such a case, the user operation information may be execution condition information indicating that backup or restoration is being executed for a copy pair complying with the backup/restore request. The display form of the pair state for display of the user-operated copy pair can be made different in accordance with whether the user operation information is the subsystem state information or the execution condition information.

In a fifth embodiment according to the fourth embodiment, when the user operation information is the subsystem state information, a subsystem display object, which is an object representing the storage system, and a first user operation display object, which is an object indicating that the storage system is in a state complying with the user operation, can be associated with each other and displayed, and, in a meanwhile, when the user operation information is the execution condition information, a user-operated pair display object, which is an object related to the user-operated copy pair, and a second user operation display object, which is an object indicating that the user operated-copy pair is in a state complying with the user operation, can be associated with each other and displayed. In this case, the first and second user operation display objects are in the pair state for display of the user-operated copy pair.

In a sixth embodiment, an information element representing one or a plurality of types of subsystem elements of the storage system may be related to the updated copy pair management information for each copy pair. Error specifying information for specifying an error occurrence area in the storage system can be acquired from the storage subsystem, and the error occurrence area in the storage system can be detected from the error specifying information. Furthermore, the user-unoperated copy pair, which is associated with the same subsystem element as the detected error occurrence area, can be specified from the updated copy pair management information, and the pair states for display of one or more of the specified user-unoperated copy pairs associated with the same error occurrence area can be displayed in units of the error occurrence area.

In a seventh embodiment according to the sixth embodiment, the error occurrence area may be a communication port existing on an access path to one of the user-unoperated copy pair or other logical volume. The subsystem pair state of the user-unoperated copy pair, which is associated with the communication port, may be updated to an error at the storage system having the communication port, by the occurrence of an error at the communication port. A port display object, which is an object representing the communication port of the error occurrence area, and an error display object, which is an object representing the error, can be associated with each other and displayed.

In an eighth embodiment according to the sixth embodiment, the error occurrence area may be a common storage resource which is used by the user-unoperated copy pair. A subsystem pair state of the user-unoperated copy pair, which is related to the common storage resource, may be updated to an error at the storage system having the common storage resource, by the occurrence of an error at the common storage resource. A common resource display object, which is an object representing the common storage resource of the error occurrence area, and an error display object, which is an object representing the error, can be associated with each other and displayed.

In a ninth embodiment according to the sixth embodiment, the error occurrence area may be a specific hardware in the storage system other than the communication port existing on the access path to one of the user-unoperated copy pair or other logical volume. A subsystem pair state of the user-unoperated copy pair, which is related to the storage system with the hardware, may be updated to an error at the storage system having the hardware, by the occurrence of an error at the hardware. A subsystem display object, which is an object representing the storage system having the hardware of the error occurrence area, and an error display object, which is an object representing the error, can be associated with each other and displayed.

In a tenth embodiment according to the sixth embodiment, an error area display object, which is an object representing the error occurrence area, and an error display object, which is an object displaying an error, can be associated with each other and displayed. When the error display object is designated by the user, detailed information comprising at least one user-unoperated copy pairs related to the error occurrence area, and the pair state for display and/or a subsystem pair state of each user-unoperated copy pair can be displayed.

In an eleventh embodiment according to the sixth embodiment, the pair state for display of the user-unoperated copy pair can be determined on the basis of the subsystem pair state of the user-unoperated copy pair.

In a twelfth embodiment according to the eleventh embodiment, on the basis of the subsystem pair state of the user-unoperated copy pair and other type of information of the user-unoperated copy pair, the pair state for display can be determined as a normal state representing a state requiring no particular processing if the subsystem pair state is an expected subsystem pair state, the pair state for display can be determined as an error state representing a state in which an error occurs and which thus requires to be processed in any way if the subsystem pair state is an error, and, for the user-unoperated copy pairs in other conditions, the pair states for display can be determined as a warning state representing a state in which no error occurs but some processing needs to be performed.

In a thirteenth embodiment according to the twelfth embodiment, a user-unoperated pair display object, which is an object related to the user-unoperated copy pair in which the pair state for display is determined as the warning state, and a warning display object, which is an object representing the warning state, can be associated with each other and displayed. When the warning display object is designated by the user, detailed information related to the user-unoperated copy pair and specified from the updated copy pair management information can be displayed.

In the display method according to a second aspect of the present invention: a storage system holds copy pair management information in which is recorded, for each copy pair, a subsystem pair state which is a pair state in the storage system, the copy pair management information being associated with an information element representing one or a plurality of types of subsystem elements of the storage system, for each copy pair; error specifying information for specifying an error occurrence area in the storage system can be acquired from one storage subsystem or each of a plurality of the storage systems, to detect the error occurrence area in the storage system from the error specifying information; and a copy pair, which is associated with the same subsystem element as the detected error occurrence area, is specified from the copy pair management information, to display, in units of the error occurrence area, the pair states for display of one or more of the specified copy pairs associated with the same error occurrence area.

In a first embodiment, the pair state for display of the copy pair can be determined on the basis of the subsystem pair state of the copy pair.

In a second embodiment according to the first embodiment, on the basis of the subsystem pair state of the copy pair and other type of information of the copy pair which is specified from the copy pair management information, if the subsystem pair state is an expected subsystem pair state the pair state for display can be determined as a normal state representing a state requiring no particular processing, if the subsystem pair state is an error the pair state for display can be determined as an error state representing a state in which an error occurs and which thus requires to be processed in any way, and, for the copy pairs in other conditions, the pair states for display can be determined as a warning state representing a state in which no error occurs but some processing needs to be performed.

In a third embodiment according to the second embodiment, an object related to the copy pair in which the pair state for display is determined as the warning state, and a warning display object, which is an object representing the warning state, can be associated with each other and displayed. When the warning display object is designated by the user, detailed information related to the copy pair and specified from the copy pair management information can be displayed.

A display device according to a third aspect of the present invention is configured such that a user request, which is a request complying with an intentional operation performed on a host computer by a user, is transmitted to a storage system by the host computer, and that the storage system which receives the user request records on a storage region thereof user operation information, which is information related to the user request, and changes, in copy pair management information in which is recorded for each copy pair a subsystem pair state which is a pair state in the storage system, a subsystem pair state of a copy pair related to the user request to a subsystem pair state accompanied with the user request, the display device comprising: an acquisition portion for acquiring the user operation information and the copy pair management information after update from a storage subsystem; a distinction portion for making a distinction between a user-operated copy pair, which is in the subsystem pair state changed in accompany with the user request complying with user operation performed intentionally by the user, and a user-unoperated copy pair which is not in the subsystem pair state, by using the acquired user operation information and updated copy pair management information; and a display portion for providing a screen for displaying, on the basis of a result of the distinction, a pair state for display of the user-operated copy pair and a pair state for display of the user-unoperated copy pair, in different display modes respectively.

In the display device according to a fourth aspect of the present invention, the storage system holds copy pair management information in which is recorded, for each copy pair, a subsystem pair state which is a pair state in the storage system, the copy pair management information being associated with an information element representing one or a plurality of types of subsystem elements of the storage system, for each copy pair, the display device comprising: a first acquisition portion for acquiring the copy pair management information from each of storage subsystems; a second acquisition portion for acquiring, from the storage subsystems, error specifying information for specifying an error occurrence area in the storage system; a detection portion for detecting the error occurrence area in the storage system from the acquired error specifying information; and a display portion for providing a screen for specifying a copy pair, which is associated with the same subsystem element as the detected error occurrence area, from the copy pair management information, and displaying, in units of the error occurrence area, the pair states for display of one or more of the specified copy pairs associated with the same error occurrence area.

The above-described display device may be, for example, a server machine, a host computer, or a device provided in a storage system. The processing performed in the above-described display method and display device can be executed by predetermined parts. The parts can be rephrased to "means". The parts or means can be realized by a hardware (a circuit, for example), a computer program, or a combination thereof (for example, one or a plurality of CPUs for reading and executing a computer program). Each computer program can be read from a storage resource (memory, for example). The storage resource can be installed via a recording medium such as a CD-ROM or DVD (Digital Versatile Disk), or can be downloaded via a communication network such as the Internet or LAN. The database management system described above can be taken as a computer program. Furthermore, the database management system described above can be mounted on a storage subsystem or on a host computer controlling the storage subsystem.

According to the display method related to the first aspect of the present invention and the display device related to the third aspect of the present invention, display can be performed so that a distinction can be made between intentionally change of a pair state performed by a user or involuntary change of a pair state.

According to the display method related to the second aspect of the present invention and the display device related to the fourth aspect of the present invention, a display can be performed so that the user can easily comprehend the scope of the occurrence of the error state in the case where the error state occurs simultaneously on a number of copy pairs.

BRIEF DESCRIPTION OF THE DRAWINGS

FIG. 11A shows an example of a backup/restore execution condition table 77 in S40 of FIG. 5;

FIG. 11B shows a configuration example of a display copy pair state table 67;

FIG. 11C shows a configuration example of a pair state priority table 69;

FIG. 12A shows an example of a copy pair state table 65 in S200 of FIG. 6;

FIG. 12B shows an example of the copy pair state table 65 at the point of time when S254 of FIG. 7 is completed;

FIG. 13A shows an example of the copy pair state table 65 at the point of time when S257 of FIG. 7 is completed;

FIG. 13B shows an example of the copy pair state table 65 at the point of time when the processing of FIG. 8 is completed;

FIG. 14A shows an example of the copy pair state table 65 in the case where the volume pool capacity becomes inadequate in S357 of FIG. 9;

FIG. 14B shows a display example of a monitor screen 61 in the case where all copy groups as the targets of monitoring are determined as "normal";

FIG. 17 shows a configuration example of a copy pair management table held in a storage subsystem 31A;

DESCRIPTION OF THE PREFERRED EMBODIMENTS

Figure 1A:
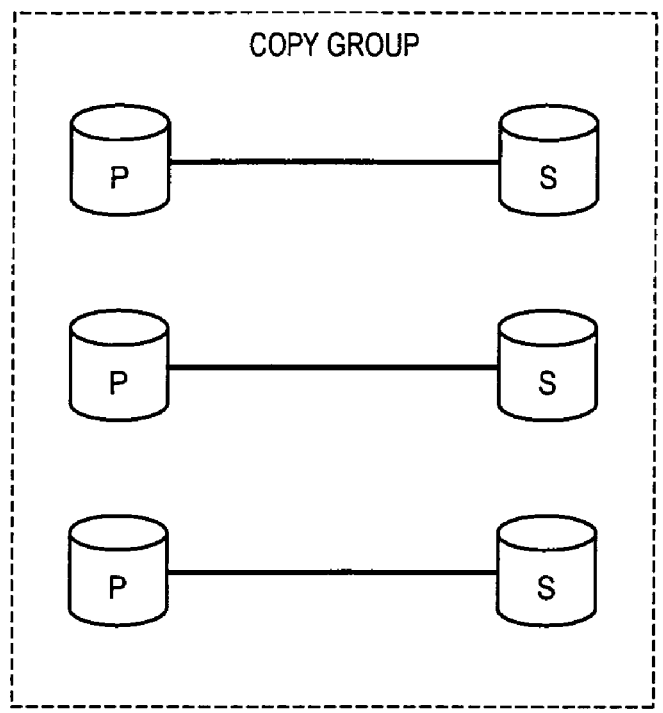
FIG. 1A is an explanatory diagram of a copy group.
Figure 1B:
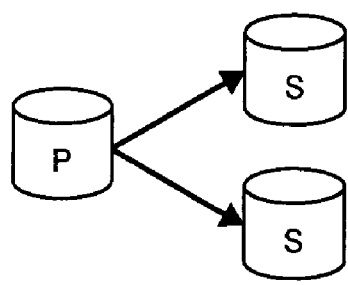
FIG. 1B shows an example of a configuration of a volume pair.
Figure 1C:
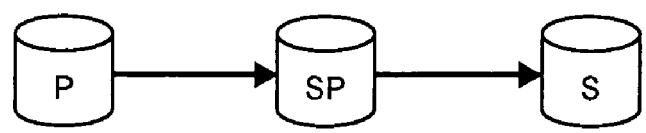
FIG. 1C shows another example of the configuration of the volume pair.
Figures 2A, 2B, 2C, 2D:
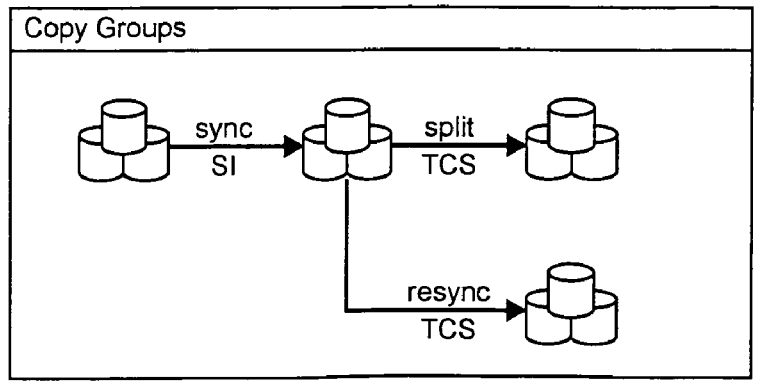
FIG. 2A shows an example of conventional display of a copy pair.
FIG. 2B shows an improved example of the conventional display of the copy pair.
FIG. 2C shows another improved example of the conventional display of the copy pair.
FIG. 2D shows yet another improved example of the conventional display of the copy pair.
Figure 3:
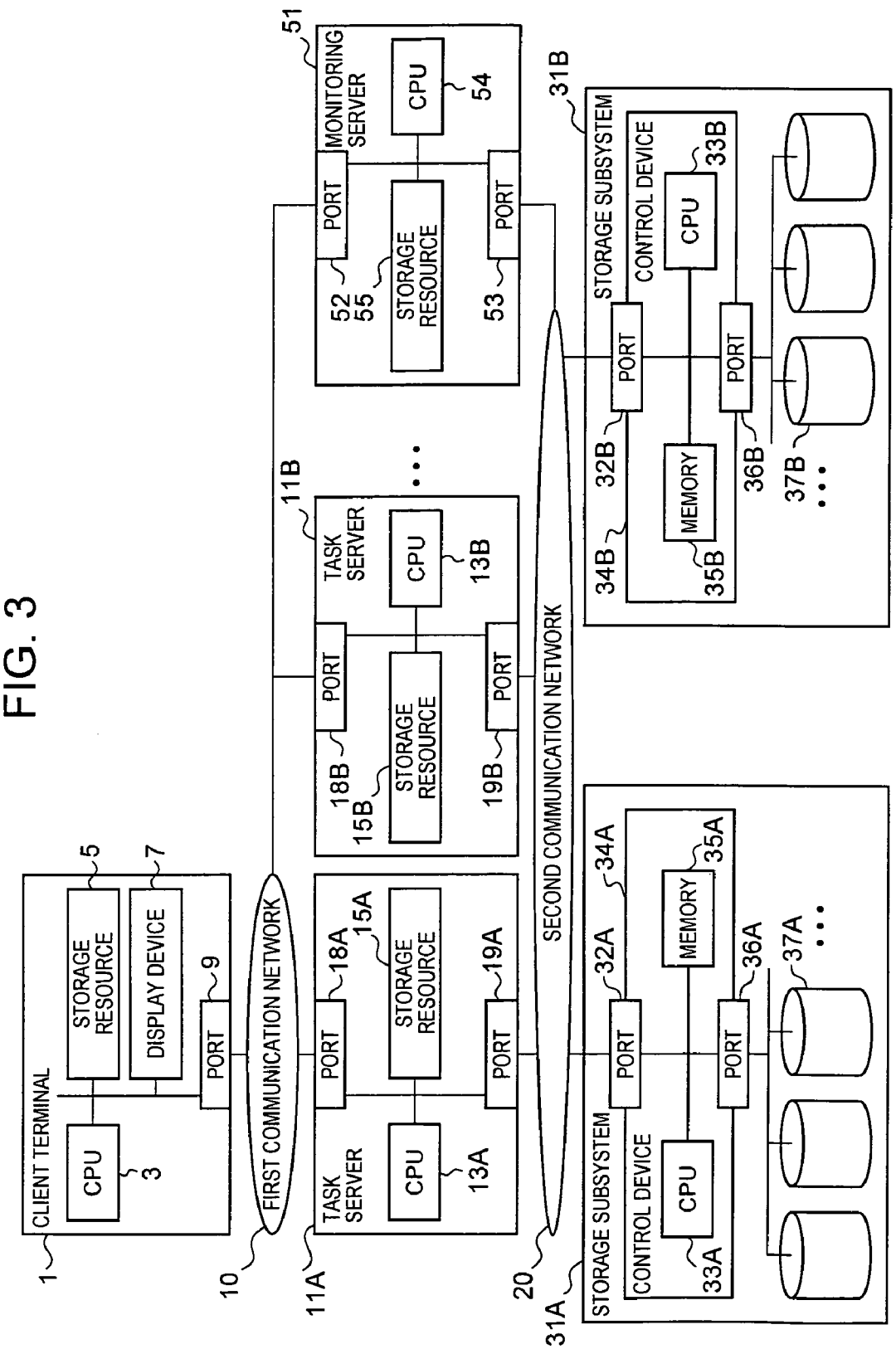
FIG. 3 shows a hardware configuration example of the entire system according to an embodiment of the present invention.

FIG. 3 shows a hardware configuration example of the entire system according to an embodiment of the present invention. It should be noted in FIG. 3 that a set of a common main number and an individual sub-character (for example, 11A, 11B) is applied to the like elements. Hereinafter, when distinguishing between the like elements explanation is provided using the main numbers only, and, when distinguishing between the like elements explanation is provided using the set of a main number and a sub-character. The same is applied for the other figures.

For example, a client terminal 1, at least one task server 11 (two task servers 11A and 11B, hereinafter), and a monitoring server 51 are connected to a first communication network 10. furthermore, the plurality of task servers 11A and 11B, the monitoring server 51, and at least one storage subsystem 31 (two storage subsystems 31A and 31B, hereinafter) are connected to a second communication network 20. The first communication network 10 is a network, such as LAN (Local Area Network), for performing communication in accordance with, for example, a TCP/IP (Transmission Control Protocol/Internet Protocol). On the other hand, the second communication network 20 is a network, such as SAN (Storage Area Network), for performing communication in accordance with, for example, FC (Fiber Channel) protocol. The first communication network 10 and the second communication network 20 may be a single network.

The client terminal 1 is a type of computer and can comprise, for example, a CPU 3, a storage resource 5, a port 9 which can be connected to the first communication network 10, and a display device 7. The storage resource 5 is, for example, a memory and/or auxiliary storage device (for example, a hard disk drive ("HDD" hereinafter)). The storage resource 5 can store data and a plurality of types of computer programs. The CPU 3 can read and execute computer programs. Hereinafter, for clarity of explanation, the main body of the processing performed by reading and executing the computer programs by means of the CPU is sometimes performed by the computer program instead of the CPU.

The task server 11 also is a type of computer and can comprise, for example, a CPU 13, a storage resource 15, a port 18 which can be connected to the first communication network 10, and a port 19 which can be connected to the second communication network 20.

The monitoring server 51 also is a type of computer and can comprise, for example, a CPU 54, a storage resource 55, a port 52 which can be connected to the first communication network 10, and a port 53 which can be connected to the second communication network 20.

The storage subsystem 31 comprises a plurality of disk devices (for example, a HDD, or may be other type of physical storage devices) 37, and a control device 34 for controlling access to the disk devices. The control device 34 comprises, for example, a plurality of ports (only one port is shown in FIG. 3) 32 which can be connected to the second communication network 20, a plurality of ports (only one port is shown in FIG. 3) 36 which can be connected to the disk devices 37, a CPU 33, and a memory 35.

In the above configurations, at least one of the client terminal 1, monitoring server 51, task server 11A and 11B, and storage subsystems 31A and 31B may be virtually created (i.e. as so-called "virtual computer") in a single device. Moreover, the configuration of the control device 34 described above is an example, but other configuration can be employed. For example, instead of being configured as above, at least one of the control devices 34A and 34B can be configured so as to comprise a plurality of first control portions (control circuit boards, for example) for controlling communication with external devices (for example, servers or storage subsystems other than the first control portions), a plurality of second control portions (for example, control circuit boards) for controlling communication with the disk devices, a cache memory which can store data communicated between the external devices and the disk devices, a control memory which can store data for controlling the storage subsystems (the cache memory and the control memory do not have to be different memories), and a connection portion (for example, a switch such as a crossbar switch) for connecting each of the first control portions, each of the second control portions, the cache memory, and the control memory. In this case, the processing of the control device 34 can be carried out by either one of the first and second control portions or by collaboration thereof.

Figure 4:
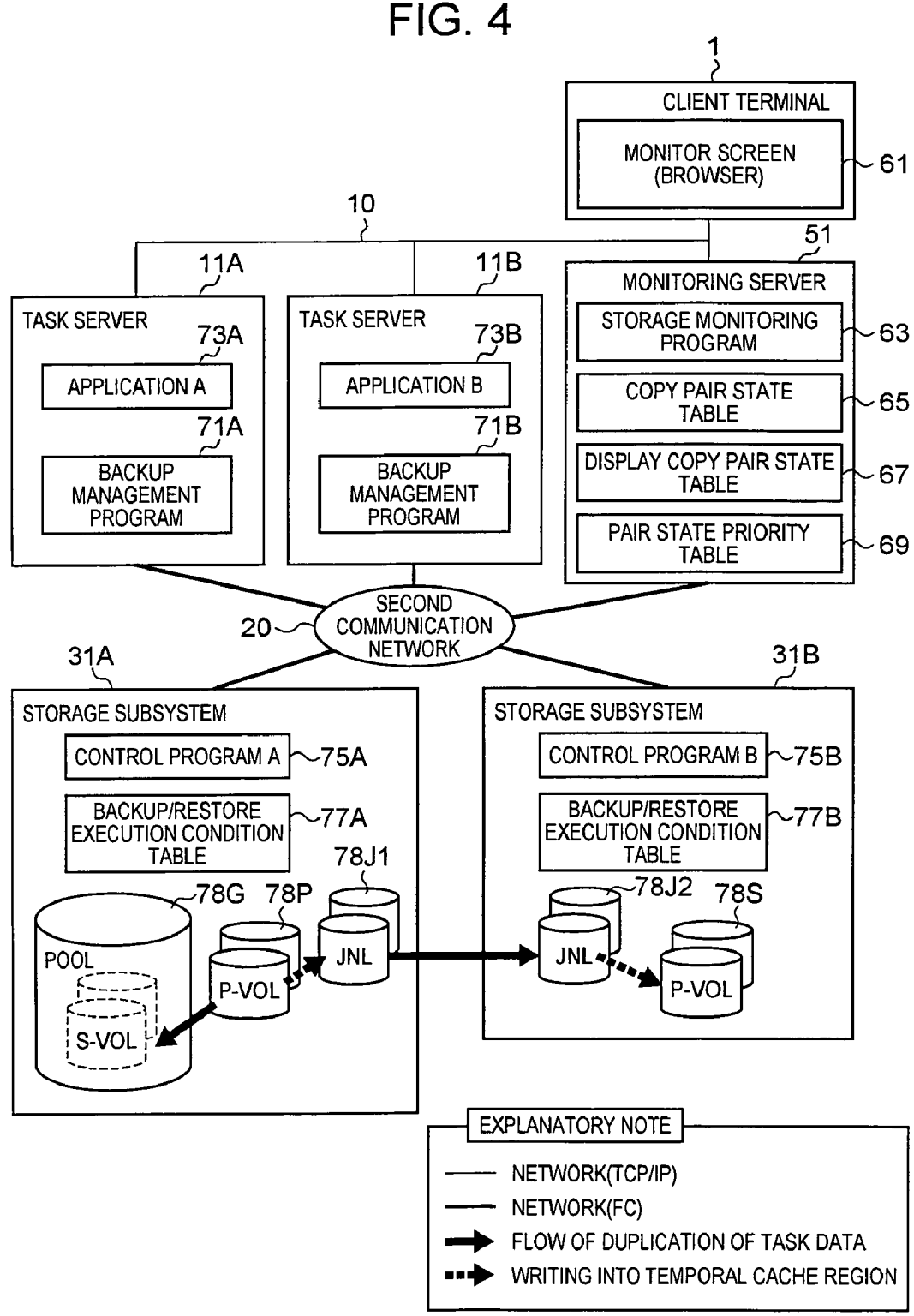
FIG. 4 shows a software configuration example of the entire system according to an embodiment of the present invention.

FIG. 4 shows a software configuration example of the entire system according to an embodiment of the present invention.

The client terminal 1 is a host as a terminal for monitoring a copy pair. On the display device 7 of the client terminal 1, a monitor screen 61 for displaying information collected by a storage monitoring program 63 described hereinafter is displayed. It should be noted in the present embodiment that the monitor screen 61 is provided by a browser (a WEB browser, for example) or may be an application developed by Java® or the like.

The task server 11 is a server for executing a task of a user. In the task server 11, an application program ("application" hereinafter) 73 used in a task of the user and a backup management program 71 which is a computer program for backup management are operated.

The application 73 is a computer program for executing a task of the user. The application 73 can read data recorded in logical volumes 78 (PVOL 78P, for example) prepared in the storage subsystem 31, and write data into the logical volumes 78. It should be noted in the present embodiment that although the applications 73A, 73B are operated on the task servers 11A, 11B respectively, as long as there is one application, the number of the applications is not limited.

The backup management program 71 can control a volume copy pair provided in the storage subsystem 31, staticize or cancel staticization of the application 73, and back up and restore data used by the application 73. The program 71 comprises a schedule function, can execute regular backup, and, at that moment, can successively record information indicating an execution condition of backup or restoration, in a storage region inside the storage subsystem 31 via a control program 75 inside the storage subsystem 31. In order to perform backup in units of the logical volume, the program 71 further holds the relationship between each application 73 and the logical volume used by the each application 73 (for example, an ID of the application 73 and an ID of the logical volume 78 used by the application 73), as a volume management table (not shown).

The monitoring server 51 is a server for monitoring the storage subsystem 31, and the a storage monitoring program 63 is installed on the monitoring server 51. In the storage resource 55 of the monitoring server 51, not only the storage monitoring program 63, but also a copy pair state table 65, a display copy pair state table 67, and a pair state priority table 69 are stored. These various tables are described hereinafter. It should be noted in the present embodiment that although the monitoring server 51 and the task server 11 are separate devices, the monitoring server 51 and the task server 11 may be integrated.

The storage monitoring program 63 is a program for monitoring a duplication condition of the logical volumes 78. The storage monitoring program 63 regularly can acquire a pair state for each copy pair from the control program 75 inside the storage subsystem 31, process the acquired pair state, and display the copy pair state on a GUI screen of a client. Moreover, in a similar manner, the storage monitoring program 63 can acquire an operation mode of the storage subsystem 31, a usage condition of a common resource of a copy pair, and an execution state recorded in a backup/restore execution condition table 77 recorded in the memory 35 (or may be other storage region) inside the storage subsystem 31, and can further receive SNMP (Simple Network Management Protocol) trap information issued from the storage subsystem 31.

The storage subsystem 31 comprises the control program 75, the backup/restore execution condition table 77, and the plurality of logical volumes 78.

The control program 75 is a program for performing control on the logical volumes 78 according to a request from the task server 11 and providing various information recorded in the storage region of the storage subsystem 31. Specifically, for example, the program 75 can create a snapshot of data on a SVOL and record an execution condition in backup or restoration on the backup/restore execution condition table 77 by splitting and resynchronizing a copy pair in accordance with a request from the backup management program 71. Moreover, for example, the program 75, complying with to a request from the storage monitoring program 63, can notify the monitoring server 51 of the latest copy pair state, an operation mode of the storage subsystem 31, a usage condition of the common storage resource of the copy pair, and a backup/restore execution condition.

The logical volumes 78 are logical storage devices created using the storage regions provided by the plurality of grouped disk devices 37 in accordance with, for example, the principle of RAID (Redundant Array of Independent (or Inexpensive) Disks). In the present embodiment, as the types of the logical volumes 78, there are PVOL 78P, SVOL 78S, and JNLVOL 78J. There is also a volume pool 78G in which the plurality of logical volumes are grouped together.

The PVOL 78P stores data used by the application 73. If there is a data write request from the application 73, data is written to the volume 78P via the control program 75. Reading of data is performed in the same route.

The SVOL 78S can store data inside the PVOL 78P. For example, the SVOL 78S holds, as backup data, a snapshot image which is obtained at the time when a copy pair is split due to a request from the backup management program 71. It should be noted in the present embodiment that the volume 78S is a virtual volume created by the control program 75, and the actual data may be stored in the logical volumes 78 configuring the volume pool 78G. Furthermore, as shown in FIG. 4, the data inside the PVOL 78P may be stored in the SVOL 78S via, for example, a plurality of the JNLVOL 78J.

The volume pool 78G is a volume group as an entity of virtual volume storing a snapshot image. Since the volume group 78G is virtualized as a duplicate volume by the control program 75, the volume group 78G is not recognized in the processing performed in the task server 11. However, actually the differential data for holding a snapshot is stored in the volume group 78G. The user can efficiently utilize the volumes by acquiring a snapshot of data using the virtual volume, as compared to the case of acquiring a duplicate using an actual volume. Without using this method, for example, a snapshot may be acquired using the actual volume instead of the virtualized volume.

The JNLVOL 78J is a volume in which is recorded information representing a write history in the PVOL 78P ("journal" hereinafter). Each journal has, for example, data after update and an updated sequential order. The JNLVOL 78J is a temporal cache region which is sued for ensuring a sequential order for writing data into copy pairs inside the same copy group when performing asynchronous remote copy. At the point of time when the application 73 writes data into the PVOL 78P, a corresponding journal is created by the control program 75A and written into a JNLVOL 78J1. Thereafter, the journal is acquired by a JNLVOL 78J2 by a remote control program 75B (or may be a local control program 75A) in chronological order, and reflected in the SVOL 78S inside the acquired journal. The journal is deleted from the JNLVOL 78J when data transfer is completed (or when data reflection in the SVOL 78S is completed). It should be noted in the present embodiment that although the JNLVOL is used as a primary cache region, a predetermined storage area ("side file" hereinafter) provided in the memory 35A may be used as the primary cache region, and asynchronous remote copy may be performed from the side file. In this case, transfer of the data accumulated in the side file may be performed by the local control program 75A. Moreover, not only the asynchronous remote copy but also synchronous remote copy (for example, copy which is performed such that data written into the PVOL 78P is transferred from the storage subsystem 31A to 31B and written into the SVOL 78S, without using the JNLVOL or side file) may be performed.

The above explanation is the software configuration example of the system related to the present embodiment. Although several types of the logical volumes 78 are described above, not only to these types but also other types may be employed, or the number of the types may be less than the number of above types. Specifically, the characteristic of the present embodiment is in a technology for displaying a pair state of a copy pair, and this technology can be applied to a copy pair having any type of logical volume.

It should be noted that a pair state of a copy pair is classified broadly into a pair state intended by the user and an involuntary pair state. The involuntary state can be classified into an error state which is a pair state requiring to be processed in any way and an involuntary state which does not require any processing.

The error state is typically a pair state created when a failure is detected at the hardware level or computer program level. There are illustrative embodiments (1) and (2) of the error state as follows.

Illustrative Embodiment (1)

A state of a copy pair of remote copies, in which a failure is generated in the communication medium (a switch or cable, for example) between the both subsystems, whereby the data can no longer be transferred from the PVOL 78P to the SVOL 78S, thus the identity between the data of the SVOL 78S and the data of the PVOL 78P can no longer be ensured.

Illustrative Embodiment (2)

A state of a copy pair of local copies, in which the control program 75A can no longer manage the abovementioned differential data, thus validity of the snapshot data acquired by the SVOL 78S can no longer be ensured.

In the above illustrative embodiments, a failure is detected at the hardware level or computer program level, thus the failure can be detected as an error by the control program 75.

On the other hand, as the involuntary state which is not the error state, there is an involuntary state created by an erroneous operation of the user. There are illustrative embodiments (i) and (ii) of such an involuntary state as follows.

Illustrative Embodiment (i)

A state of a copy pair of remote copies, in which the copy pair is split by the user, thus the identity between the data of the SVOL 78S and the data of the PVOL 78P can no longer be ensured.

Illustrative Embodiment (ii)

A state of a copy pair of local copies, in which the user splits the copy pair without staticizing the application 73 (without causing the application 73 to stop updating the data of the PVOL 78P), thus validity of the snapshot data acquired by the SVOL 78S can no longer be ensured.

In the above two illustrative embodiments, the fact that the pair state has changed can be detected by the control program 75, but the operation itself is ended normally, thus the change of the pair state cannot be determined as an error by the control program 75.

The present embodiment provides (1) a mechanism for enabling to distinguish between change of a pair state performed intentionally by the user and change of pair state performed involuntarily by the user, (2) a mechanism for enabling to easily comprehend the scope of the occurrence of an error state when a number of copy pairs are brought into the error state, and (3) a mechanism for enabling to easily comprehend detailed information required for determination when it is uncertain whether the pair state is the error state or not. Hereinafter, each of the mechanisms are described in detail. It should be noted in the description hereinafter copy groups are connected in the form of a cascade (specifically, each SVOL in a copy group and each PVOL in other copy group are the same volume). Furthermore, suppose that a backup schedule (for example, one or more time of day at which backup should be executed) is set in the backup management program 71. Moreover, suppose that the backup management program 71 holds, as a volume management table, a volume used by the application program 73 operating on the task server 11 operated by the program 71. In addition, suppose that a table to which a port ID for a volume of each copy pair and an ID of each of the volumes constituting the copy pairs is stored in each of the storage subsystems 31.

(1) A mechanism for enabling to distinguish between change of a pair state performed intentionally by the user and change of pair state performed involuntarily by the user.

One of the characteristics of this mechanism focuses on that intentional change of a pair state which is performed by the user is carried out by a backup or restore operation and a maintenance operation performed when changing the system configuration. In this embodiment, the storage monitoring program 63 discriminates whether an operation performed by the user is the backup or restore operation or the maintenance operation performed when changing the system configuration, whereby a distinction can be made between change of a pair state which is performed intentionally by the user and change of a pair state performed involuntarily by the user.

In the case of the backup or restore operation, specifically, for example, the storage monitoring program 63 can specify a copy pair, which is subjected to the backup or restore operation, from the execution condition information which is recorded in the backup/restore execution condition table 77 when the backup management program 71 performs the backup/restore operation, determine whether the pair state of the specified copy pair is a pair state associated with the backup or restore operation, and display the pair state of the copy pair so that the user can determine whether it is the change performed intentionally by the user (for example, whether it is the change associated with the backup or restore operation) on the basis of a result of the above determination.

In the case of the maintenance operation, specifically, for example, when a request according to the maintenance operation performed when changing the system configuration is received from the task server 11, the storage subsystem 31 writes information indicating that the operation mode is "maintenance" into the memory 35 (or other storage region), and the storage monitoring program 63 can acquire the information indicating the operation mode of the storage subsystem 31 from the control program 75, determine, on the basis of the information, whether or not the storage subsystem 31 as a target of monitoring is under maintenance, and display the pair state of the copy pair so that the user can determine whether it is the change performed intentionally by the user (for example, whether it is the change associated with the maintenance operation performed when changing the system configuration) on the basis of a result of the above determination.

In the above manner, the user can distinguish between the change of a pair state which is performed intentionally by the user and the change of a pair state which is performed involuntarily by the user. When the backup operation or restore operation is performed, the control program 75 can change the pair state of the copy pair, which is a target of operation, to a split mode. Further, when the maintenance operation is performed, the control program 75 can record "under maintenance" of the operation mode on the memory 35, and reset all of the pair states of the copy pairs that belong to the subsystem which is under maintenance (bring the pair states into, for example, a state in which the split mode and difference are not reflected).

(2) A mechanism for enabling to easily comprehend the scope of the occurrence of an error state when a number of copy pairs are brought into the error state.

In the present embodiment, the case in which an error occurs in a number of copy pairs is classified into three patterns below (case A) through (case C), and the error state of a copy pair which is abstracted to the same degree as the scope of the occurrence a failure is displayed on a screen, whereby the user can have a panoramic comprehension of the error occurred in a number of copy pairs.

(Case A: An Error State Occurs in Units of the Communication Port of Remote Copies)

A situation in which a failure occurs on a communication path of remote copies when configuring copy pairs of remote copies between the subsystems corresponds to the present case. The storage monitoring program 63 determines whether such a situation corresponds to the present case or not by using the information on change of state performed on the copy pairs, the SNMP trap information issued from the storage subsystem 31, and the data transfer amount in a remote port, which is acquired from the control program 75 of the storage subsystem 31. As a result of the determination, if the situation corresponds to the present case, the storage monitoring program 63 displays a screen displaying the pair states of the copy pairs of remote copies in units of the communication port, and, on this display screen, displays a screen showing that all copy pairs, which are related to the communication ports where the error has occurred, are in the error state. It should be noted that the communication ports are the ports connected to the second communication network 20, but may be ports connected to the disk device 37. Further, the SNMP trap information includes information elements corresponding to the condition, such as IDs of the communication ports where the error has occurred and ID of the storage subsystems where the error has occurred.

(Case B: An Error State Occurs in Units of the Common Storage Resource of Copy Pairs)

A situation in which the common storage resource, which is prepared in the storage subsystem 31 in order to maintain a copy pair of local copies and a copy pair of remote copies, becomes inadequate corresponds to the present case. Here, specific examples of the common storage resource include JNLVOL, which is a cache region for storing transfer data of the remote copy, and a volume pool for storing the differential data (for example, a bitmap representing the difference, or the differential data between the VOLs) for holding a snapshot image of the local copy. The storage monitoring program 63 determines whether such a situation corresponds to the present case or not by using the information on change of state performed on copy pairs, the SNMP trap information issued from the storage subsystem 31, and the used amount of the common storage resource, which is acquired from the control program 75 of the storage subsystem 31. As a result of the determination, if the situation corresponds to the present case, the storage monitoring program 63 displays a screen displaying the pair states in units of the storage subsystem, and, on this screen, shows that all copy pairs, which are related to the storage subsystem 31 having the common storage resource where the error has occurred, are in the error state. If the common storage resource of the storage subsystem 31, which is the target of display, is logically divided, the units in which the pair states are displayed can be taken as units of the logically divided units.

(Case C: An Error State Occurs in Units of the Hardware of the Storage Subsystem 31)

A situation in which some sort of failure occurs in a physical component configuring the storage subsystem 31 corresponds to the present case. The storage monitoring program 63 determines whether such a situation corresponds to the present case or not by using the information on change of state performed on the copy pair, and the SNMP trap information issued from the storage subsystem. As a result of the determination, if the situation corresponds to the present case, the storage monitoring program 63 displays a screen displaying the pair states in units of the storage subsystem 31, and, on this display screen, shows that all copy pairs, which are related to the storage subsystem 31 where the failure has occurred, are in the error state.

In the above manner, when an error such as a hardware failure or a communication failure occurs simultaneously on a number of copy pairs, the user can promptly comprehend the scope of the occurrence of the error.

(3) A mechanism for enabling to easily comprehend detailed Information required for determination when it is uncertain Whether the pair state is the error state or not.

This is the case in which it is uncertain whether the changed pair state is the error state or not when the change of pair state does not correspond to any of (1) and (2) above. Therefore, in the present embodiment, instead of displaying information representing a result of determination on whether the pair state is a normal state or error state, the storage monitoring program 63 displays a target copy pair whose pair state is changed, the state of the copy pair, and the detailed information associated to the copy pair. Accordingly, the user can determine whether the copy pair is the error state or not. However, if all of the information items are displayed forcedly on a single screen, the size of each character to be displayed becomes small due to the excessive amount of information. Thus, an icon indicating a warning is displayed so that a copy pair whose pair state is changed can be viewed easily. When the icon is clicked, a pop-up is displayed, and the target copy pair whose pair state is changed, the pair state of the copy pair, and the detailed information associated with the copy pair and required for determination of the user are displayed on the pop-up.

In the above manner, the user can promptly confirm the target copy, the pair state of thereof, and the detailed information thereof, regarding the change of pair state for which it is uncertain whether it is the error state or not.

Hereinafter, the present embodiment is described in detail.

Figure 5:
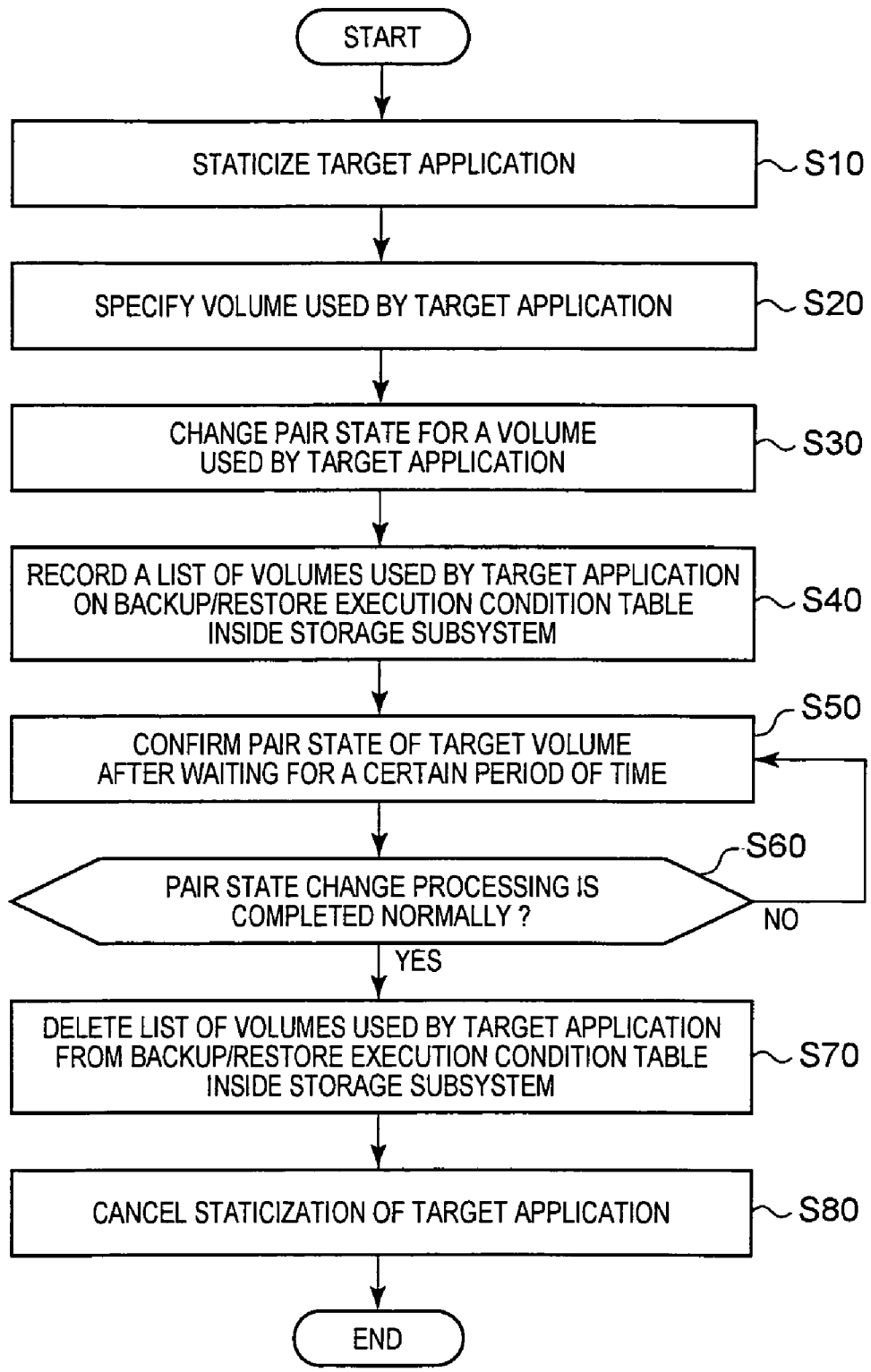
FIG. 5 shows an example of a flow of processing performed by a backup management program 71.

FIG. 5 shows an example of a flow of processing performed by the backup management program 71. Hereinafter, the program is designated as 71A. Further, at least the PVOL of a copy pair exists in the storage subsystem 31. Hereinafter, an example of backup operation is taken to provided the following explanation, but the same processing is performed for restore operation as well.

The backup management program 71A staticizes a target application 73A (instructs the application 73A not to issue, for example, at least a write command of data) when performing backup and restoration of data of the application 73A (Step S10).

Next, the backup management program 71A specifies a volume used by the application 73A from the volume management table that the backup management program 71A holds (S20).

Next, the backup management program 71A requests the control program 75A inside the storage subsystem 31A to change or restore the pair state of the copy pair, and thereby acquires a backup of the PVOL used by the application 73A (S30). Specifically, for example, the backup management program 71A changes the pair state of the copy pair having the PVOL used by the application 73A, from "sync" to "split", and thereby acquires a snapshot of the PVOL.

Next, the backup management program 71A requests the control program 75A to record, on the backup/restore execution condition table 77A, a list of all copy pairs in which a backup is acquired (S40). In accordance with such a request, the control program 75A records, on the backup/restore execution condition 77A, the list of all copy pairs in which a backup is acquired, as shown in, for example, FIG. 11A. In this table 77A, the execution condition information representing an execution condition of backup or restoration is recorded. The execution condition information includes, for example, a type of operation (either a backup operation or a restore operation), a target application (an ID of an application in which backup data or restored data is used), start time (time at which backup or restoration is started in response to the backup or restore operation), and a target copy pair (an ID of a copy pair which is the target of operation). For example, the request issued in S30 includes the ID of the PVOL or the ID of the target application 73A. The control program 75A specifies a copy pair having the ID from the copy pair management table of FIG. 17 which is used for managing the copy pair, and can record, as the execution condition information, the ID of the specified copy pair, time at which backup operation is started, ID of the target application, and backup as the operation type, on the backup/restore execution condition table 77A (on the copy pair management table, an information element of the configuration information on the copy pair state table, a detailed pair state, or an ID of a volume configuring each copy pair is recorded).

When a certain time period elapses after carrying out S40, the backup management program 71A inquires of the control program 75A for the pair state of the target volume (PVOL as the target of backup), and confirms whether the changed pair state received in response to the inquiry is a desired pair state or not (in other words, whether the pair state is changed to a normal state or not) (S50). As a result, if the pair state is not the desired pair state (NO in S60), S50 is performed again, and, if the pair state is the desired pair state (YES in S60), the backup management program 71A requests the control program 75A to delete the list recorded in S40 from the backup/restore execution condition table 77A (S70). If the list is deleted by the control program 75A in response to the request, the backup management program 71A cancels staticization of the application 73A (S80). It should be noted that, when the execution condition information is deleted, the control program 75A may bring the pair state of the copy pair corresponding to the copy pair ID contained in the deleted execution condition information back to the original state (may bring the pair state to the pair state immediately executing the backup or restore operation, for example).

Through the above processing, when the backup or restore operation is carried out by an intentional operation of the user from the task server 11A, the execution condition information on backup or restore operation is recorded on the backup/restore execution condition table 77A, and, when backup or restoration is finished, the execution condition information is deleted. Specifically, whether backup or restoration is being executed or not can be determined on the basis of the presence of the execution condition information.

Figure 6:
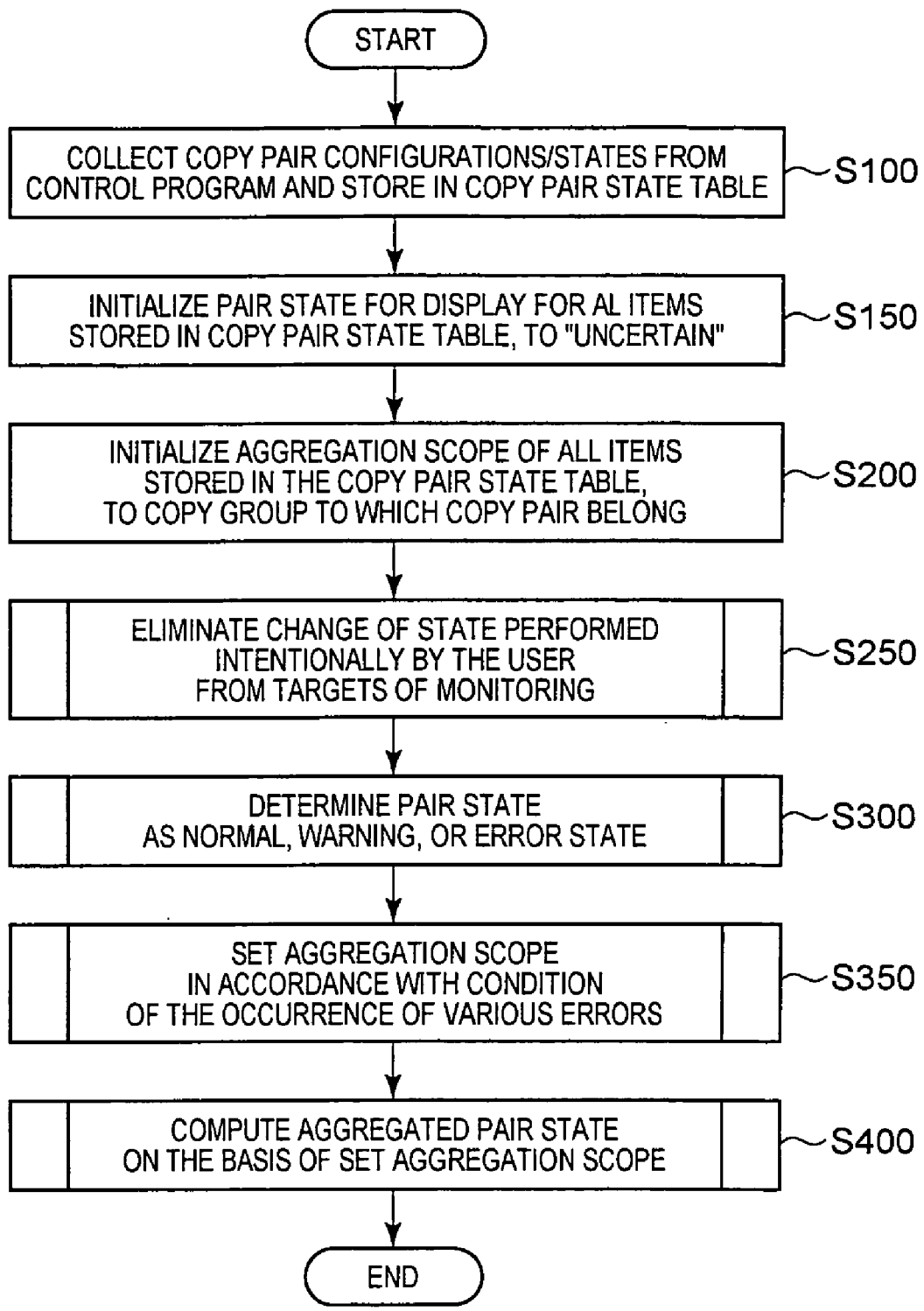
FIG. 6 shows a schematic example of a flow of processing performed by a storage monitoring program 63 before displaying a copy pair.

FIG. 6 shows a schematic example of a flow of processing performed by the storage monitoring program 63 before displaying a copy pair. It should be noted in this flow that the user can set a copy pair as the target of monitoring in advance. Specifically, the user can select a copy pair that the user wishes to monitor, from a list of copy pairs displayed on the monitor screen 61 on the client terminal 1. In this case, the storage monitoring program 63 can display all copy pairs (for example, all copy pairs recorded on the copy pair state table which is updated by performing S100 described hereinafter, in the previous step) that the storage monitoring program 63 recognizes, on the monitor screen 61.

The storage monitoring program 63 regularly (or irregularly) collects a configuration and state of a copy pair set to the configuration and state, from the storage subsystem 31 (S100). Specifically, for example, the storage monitoring program 63 acquires the latest state and related configuration information for a copy pair which is the target of monitoring (a copy pair which is set as the target of monitoring by the user) from the control program 75 inside the storage subsystem 31, and stores the acquired information on the copy pair state table 65.

Thereafter, for the processing for initialization, the storage monitoring program 63 sets "uncertain" for the pair states for display of all items registered in the copy pair state table 65, and sets, as the scope of aggregation, the name of a copy group to which the copy pair belongs (S150 and S200). An example of the copy pair state table 65 at that moment is shown in FIG. 12A. The copy pair state table 65 is a table for managing copy pair states, wherein, for example, a pair state, configuration information, and aggregation scope are recorded for each copy pair. The pair state is not only a detailed pair state (a pair state recognized in the storage subsystem 31) but also a pair state for display (a pair state displayed on the monitor screen 61). What is received from the control program 75 is not the pair state for display but the detailed pair state. The configuration information includes, for example, a copy group (an ID of a copy group to which the copy pair belongs), a port (an ID of a port in a path to PVOL or SVOL in the copy pair), a storage subsystem (an ID of a subsystem having PVOL or SVOL of the copy pair), a common resource (and ID of the common storage resource of the copy pair), and a copy type (remote copy or local copy). The configuration information is information that can be received from the control program 75, and the control program 75 can acquire the configuration information from the abovementioned copy pair management table (see FIG. 17. Recorded in, for example, the memory 35) and transmit the configuration information in response to a request from the storage monitoring program 63. The port ID may be recorded for each subsystem ID. The configurations of the port IDs of the respective storage subsystems may be the same or different from one another. The aggregation scope indicates in which scope the pair state of the copy pair is to be collected and displayed when displaying the copy state of the copy pair. For example, if the aggregation scope is a copy group, pair states are displayed in the units of copy group.

Next, the storage monitoring program 63 performs processing for eliminating changing of pair state performed intentionally by the user from the targets of monitoring (S250), processing for determining the pair state as any of normal, warning, and error states (S300), processing for setting the aggregation scope in accordance with the conditions of the occurrence of various errors (S350), and processing for computing an aggregated pair states based on the set aggregation scope (S400), and causes the monitor screen 61 to perform display on the basis of a result of these processing.

Figure 7:
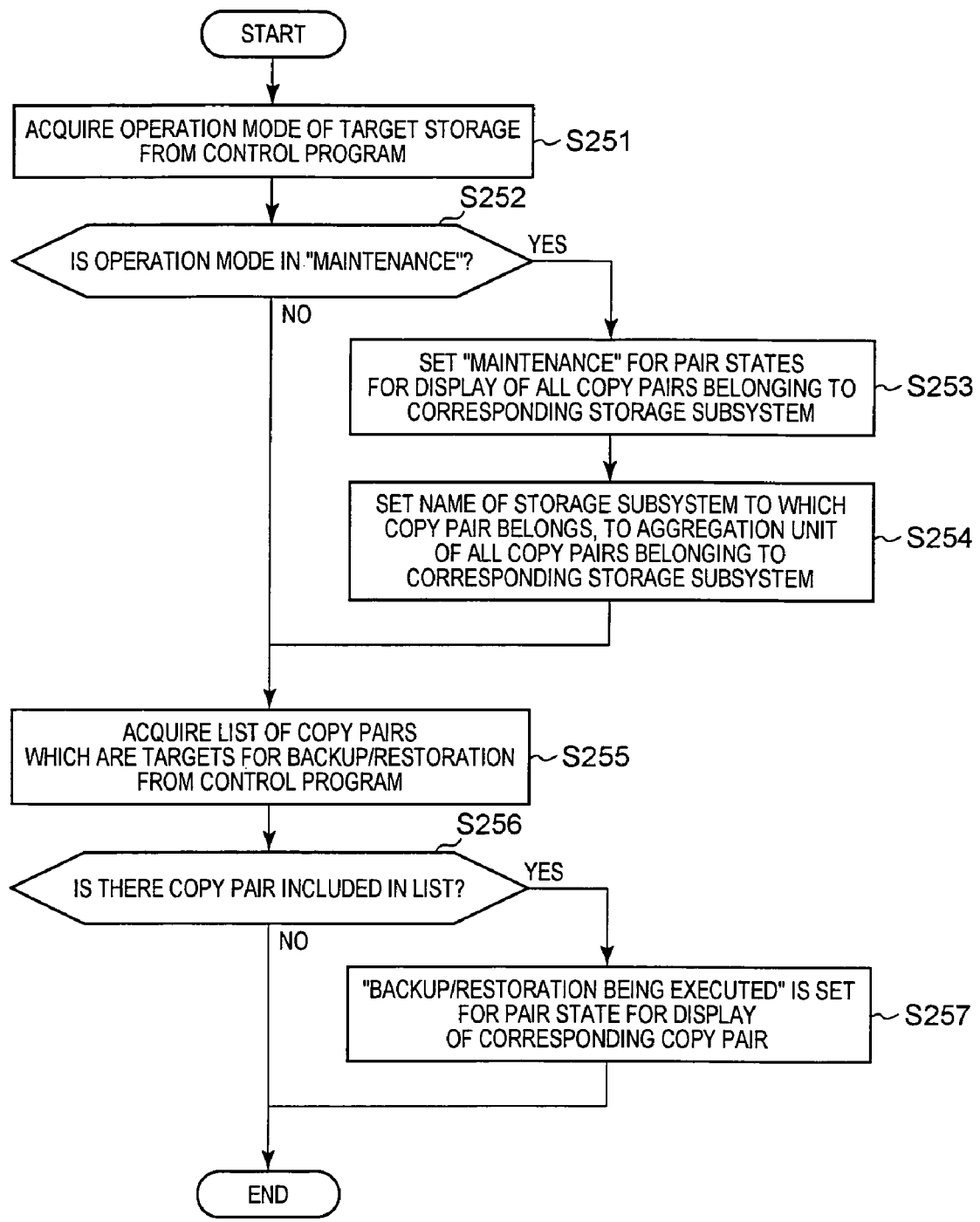
FIG. 7 shows an example of a flow of concrete processing in S250 of FIG. 6.

FIG. 7 shows an example of a flow of concrete processing in S250 of FIG. 6.

The processing shown in FIG. 7 is processing for eliminating changing of pair state performed intentionally by the user from the targets of monitoring. In the present embodiment, elimination from the targets of monitoring means processing performed so that the pair state for display of a copy pair, whose pair state is changed intentionally by the user, does not remain "uncertain". Accordingly, when determining the pair state in processing of FIG. 8, the records of the copy pair whose pair state is changed intentionally by the user are not referred to. Hereinafter, the processing is described in detail.

The storage monitoring program 63 acquires an operation mode of a target storage subsystem (a subsystem corresponding to each subsystem ID in the configuration information in the copy pair state table 65) from the control program 75 (S251). When the maintenance operation is received from the task server 11, the control program 75 writes an operation mode, "under maintenance", into the memory 35 so that the operation mode write in the memory 35 can be replied in response to a request made in S251 by the storage monitoring program 63.

If the replied operation mode is "under maintenance" (YES in S252), the storage monitoring program 63 sets, in the copy pair state table 65, "maintenance" as the pair states for display of all copy pairs belonging to the storage subsystem 31 where "under maintenance" is replied, and sets, as the aggregation scope, the ID of the storage subsystem to which the copy pair belongs (S253 and S254). FIG. 12B shows an example of the copy pair state table 65 at the point of time when S254 is completed. FIG. 12B shows an example of the case in which the storage subsystem having a subsystem ID of "Array-A" is under maintenance. It should be noted that the storage monitoring program 63 may check whether the pair state of all copy pairs belonging to the subsystem under maintenance are pair states which are changed in association with the maintenance operation, and, if a positive check result is obtained, S253 and S254 may be executed.

Thereafter (or when a result in S252 is NO), the storage monitoring program 63 acquires from the control program 75 a list of copy pairs which are the targets of backup/restore processing (specifically, all of the execution condition information items written in the backup/restore execution condition table 77) (S255), and, for all of the copy pairs included in this list, sets "backup/restoration being executed" as the pair states for display on the copy pair state table (YES in S256, and S257). FIG. 13A shows an example of the copy pair state table 65 at the point of time when S257 is completed. FIG. 13A is a result based on the execution condition table 77 shown in FIG. 11A, and shows an example of the case in which the copy group ID is "CG-C" and backup is being executed. It should be noted that the storage monitoring program 63 may check whether the pair state of the copy pairs in the execution condition information are pair states which are changed in association with the backup or restore operation, and, if a positive check result is obtained, S257 may be executed.

Figure 8:
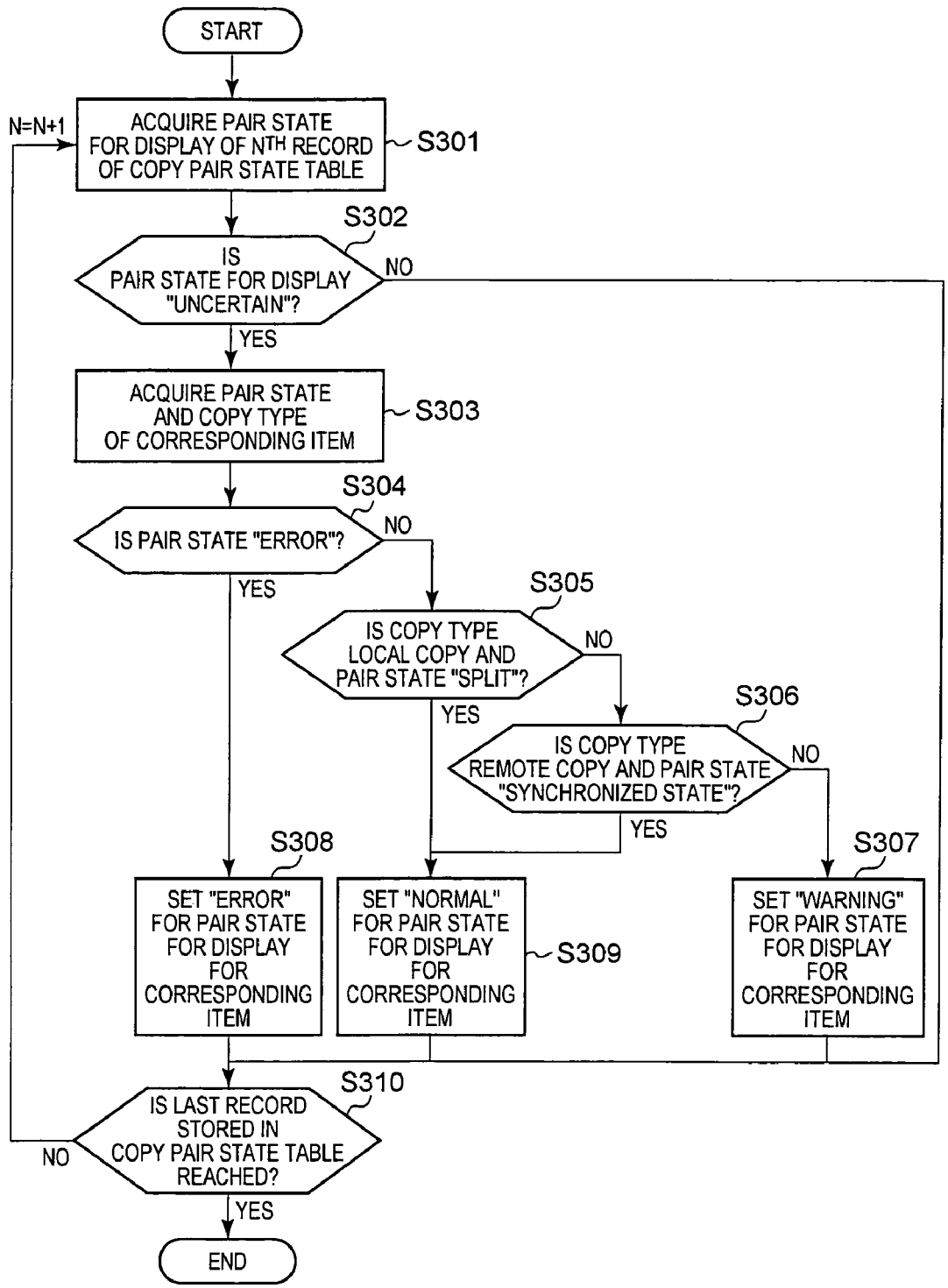
FIG. 8 shows an example of a flow of concrete processing in S300 of FIG. 6.

FIG. 8 shows an example of a flow of concrete processing in S300 of FIG. 6.

The storage monitoring program 63 acquires a pair state for display of a first record on the copy pair state table 65 (S301), and, if the pair state for display is "uncertain" (YES in S302), performs the following processing for the record.

Specifically, if the detailed pair state is "error" from the record in which the pair state for display is "uncertain" (YES in S304), the storage monitoring program 63 sets "error" for the pair state for display in the record (S308). If the copy type is "local copy" and the detailed pair state is "split" (YES in S305), or the copy type is "remote copy" and the detailed pair state is "sync" (synchronized state) (NO in S305 and YES in S306), the storage monitoring program 63 sets "normal" for the pair state for display of the record (S309). In other case (NO in S306), the storage monitoring program 63 sets "warning" for the pair state for display (S307). It should be noted that the reason that "normal" is set when the copy type is "local copy" and the detailed pair state is "split" is because it means that the snapshot of PVOL is ensured (in the split state, when PVOL is updated the difference generated by the update is acquired by SVOL). Further, the reason that "normal" is set when the copy type is "remote copy" and the detailed pair state is "sync" (synchronized state) is because remote copy in this embodiment is copy performed for the purpose of disaster recovery, and that data updated to PVOL is remote-copied to SVOL (even if the pair state is the synchronized state, remote copy may be synchronous remote copy in which updated data is transferred in synchronization with update of PVOL, or may be asynchronous remote copy in which updated data asynchronously with update of PVOL). Moreover, the reason that "warning" is set when the result in S306 is NO is because the pair state is not an expected state. In other words, "normal" is not set only when the result in S305 is YES or the result in S306 is YES, and thus can be set as long as the pair state is the expected state.

The storage monitoring program 63 performs the above processing for all records on the copy pair state table 65 (YES in S310). FIG. 13B shows an example of the copy pair state table 65 at the point of time when the processing of FIG. 8 is completed.

Figure 9:
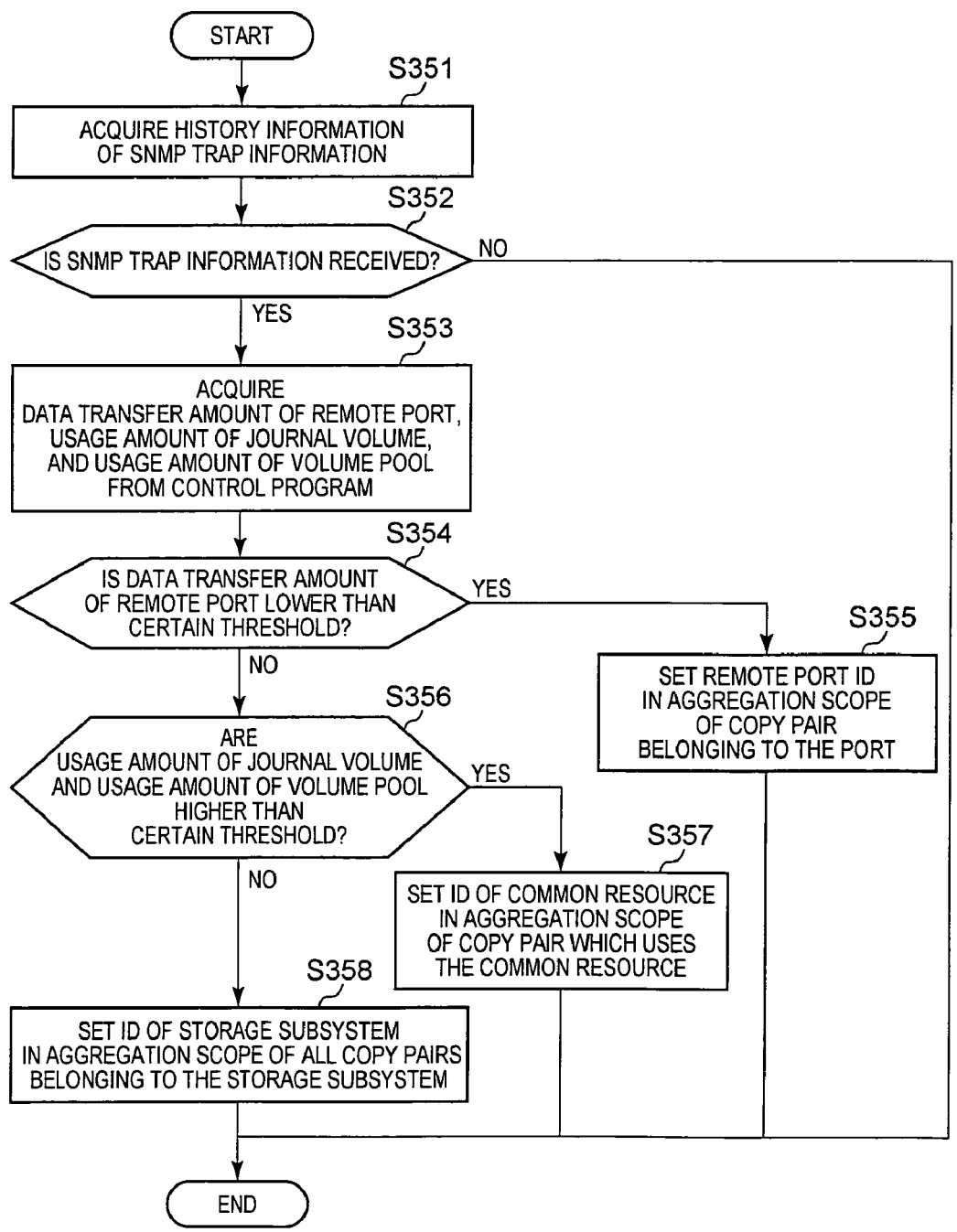
FIG. 9 shows an example of a flow of concrete processing in S350 of FIG. 6.

FIG. 9 shows an example of a flow of concrete processing in S350 of FIG. 6.

The storage monitoring program 63 holds a history representing whether the SNMP trap information is received or not and acquires information written in the history (S351). The SNMP trap information can be received when, for example, an error is detected in the storage subsystem 31.

If it is determined from the information written in the history that the SNMP trap information is received (YES in S352), the storage monitoring program 63 acquires the data transfer amount of the remote port (the port of the subsystem having SVOL), the usage amount of JNLVOL, and the usage amount of the volume pool (and other type of common storage resource, if there is any) from the control program 75 (S353), and performs the following processing (the control program 75 can update the data transfer amount of the remote port, the usage amount of JNLVOL, and the usage amount of the volume pool on the memory 35, and reply with information thereof recorded on the memory 35, in response to an inquiry from the storage monitoring program 63).

If the data transfer amount of the remote port is lower than a certain thresholds (YES in S354), the storage monitoring program 63 sets, for the copy pair belonging to a corresponding port, an ID (name, for example) of the remote port which corresponds to the aggregation scope of the copy pair state table (S355).

If the usage amount of JNLVOL or volume pool is higher than a certain threshold (YES in S356), the storage monitoring program 63 sets, for a copy pair using a corresponding common storage resource (a copy pair specified from the copy pair state table 65), an ID (name, for example) of the common storage resource which corresponds to the aggregation scope of the copy pair state table 65 (S357). FIG. 14A shows an example of the case where the capacity of the volume pool with an ID "POOL-A" becomes inadequate. It should be noted that YES in S356 and a step S357 may not be performed for a snapshot in which the actual volume is used, asynchronous remote copy in which side file is used, or synchronous remote copy.

In the case other than the above case (NO in S356), for a copy pair stored in a corresponding storage subsystem, the storage monitoring program 63 sets an ID of the corresponding storage subsystem on the aggregation scope of the copy pair state table 65 (S358).

Figure 10:
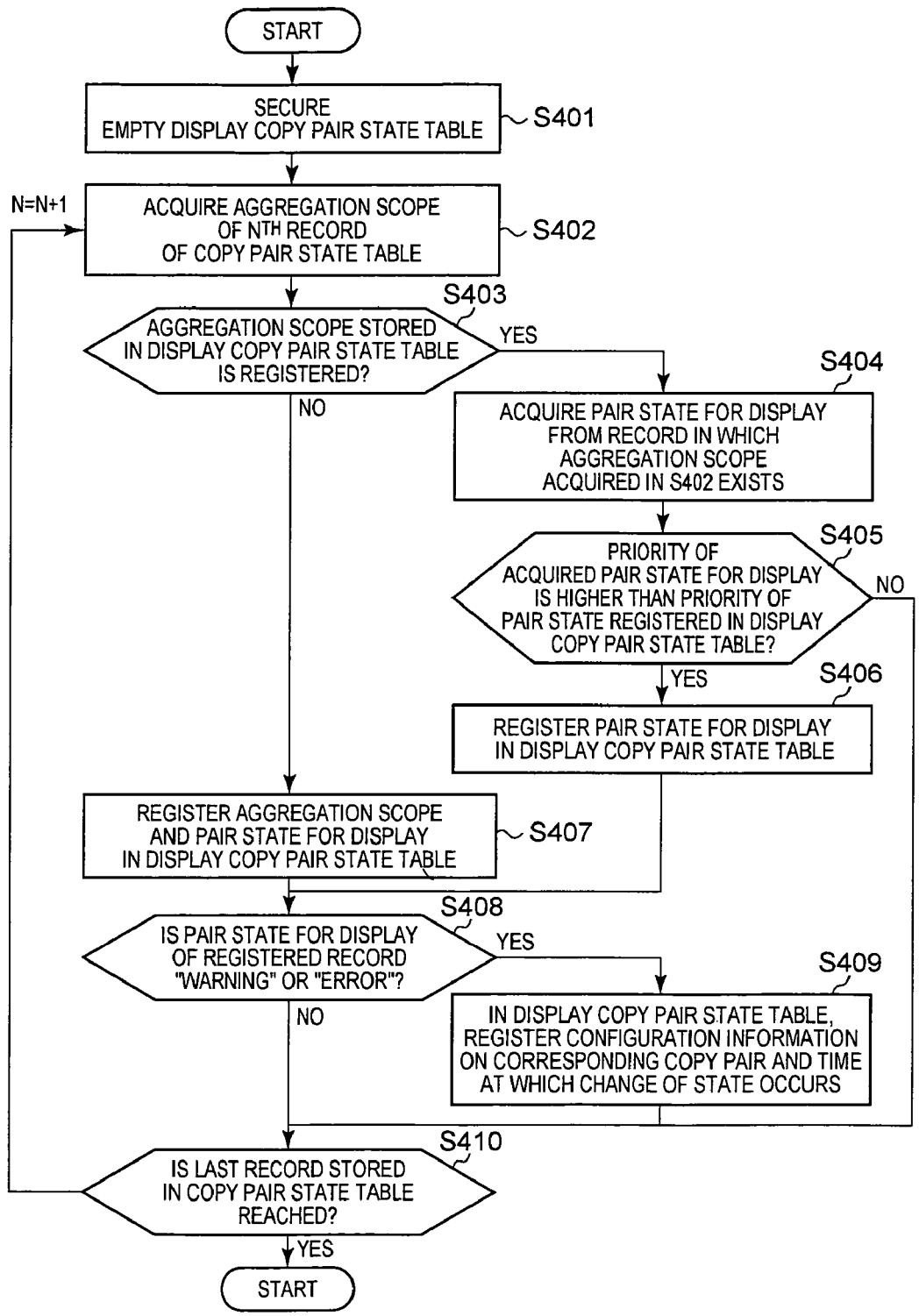
FIG. 10 shows an example of a flow of concrete processing in S400 of FIG. 6.

FIG. 10 shows an example of a flow of concrete processing in S400 of FIG. 6.

The storage monitoring program 63 secures the display copy pair state table 67 for recording an aggregation state of a copy pair (S401). A configuration example of the display copy pair state table 67 is shown in FIG. 11B. In this table 67, a target of display, a pair state, and detailed information (information displayed as detailed information) are recorded. The detailed information is, for example, a copy pair (a copy pair ID), storage subsystem (subsystem ID), and state update time. At the time of S401, no information is recorded on the table 67 (that is, each cell on the table is blank).

Next, the storage monitoring program 63 confirms the information set in the aggregation scope, for the first record on the copy pair state table 65 (S402).

The storage monitoring program 63 searches for an item registered in the display copy pair state table 67, and confirms whether the items is already registered in a confirmed aggregation scope or not (S403). In this case, set information is not registered (NO in S403), thus the information set as the aggregation scope is set as the target of display and the pair state for display is set as the pair state respectively in the display copy pair state table 67 (S407).

The above processing is successively repeated for all copy pairs registered in the copy pair state table 65, to complete the display copy pair state table 67. It should be noted at this moment that, if the aggregation scope is already registered in the display copy pair state table 67 in S403, the storage monitoring program 63 compares the pair state registered in the display copy pair state table 67 with the pair state for display (the pair state for display on the copy pair state table 65) for a corresponding copy pair (a copy pair having the same ID as the copy pair in the detailed information), and registers the one with higher priority as a copy pair state for display, in accordance with the pair state priority table 69 (see FIG. 11C) (S404, YES in S405, S406). According to the pair state priority table 69, the pair state which is changed by an intentional operation of the user is high on priority (the aggregation scope is wider for "maintenance" than "backup/restoration being execute", thus the priority for "maintenance" is higher, but the priorities of the both may be reversed). The pair state, which is brought into the error state due to an error detected at the hardware level or computer program level, has the next higher priority. The involuntary state other than the error state has the next higher priority. The priority is lowest when the state is normal. Therefore, for example, if explained using the copy pair state table 65 in FIG. 14A as an example, for the aggregation scope of "CG-C", the copy pair state for display of a copy pair "Pair-D" is acquired as "normal", where "normal" is written on the display copy pair state table 67, and then although the pair state for display of a copy pair "Pair-E" is acquired as "warning", the priority of "warning" is higher than that of "normal" according to the pair state priority table 69, thus "normal" is updated to "warning" on the display copy pair state table 67.

On the above work, when the copy pair state is "warning" or "error" (YES in S408), the storage monitoring program 63 records the detailed information such as the ID of a corresponding copy pair, the ID of a storage subsystem having the copy pair, and the state update time (time at which the state is updated), on the display copy pair state table 67 (S409). It should be noted that although the information recorded on the display copy pair state table 67 shown in FIG. 11B is the information recorded using the copy pair state table shown in FIG. 14A, the state update time can be taken as the time included in the information which is received from the control program 75 in order to construct the copy pair state table shown in FIG. 14A. Moreover, the detailed information may include information on an element configuring the target of display (in other words, the aggregation scope), in addition to the information on the copy pair corresponding to "error" or "warning". For example, if the target of display is a copy group, the detailed information may be information related to each of the all copy pairs configuring the copy group (for example, at least one of the ID of the copy pair, the detailed pair state of the copy pair, and the pair state for display of the copy pair).

Finally, the storage monitoring program 63 displays the states determined as any of "normal", "warning", "error", "backup/restoration being executed", and "under maintenance", on the monitor screen 61 on the basis of the display copy pair state table 67 through the above processing. At this moment, each of the determined states can be expressed by different icons. Hereinafter, a display example for each case is described.

(1) When the pair states for display of all copy pairs are "normal".

FIG. 14B shows a display example of the monitor screen 61 in the case where all copy groups as the targets of monitoring are determined as "normal". FIG. 14B shows an example of the case in which all of the targets of display (that is, the aggregation scope) in the table 65 shown in FIG. 12A through FIG. 14A and the display copy pair state table 67 shown in FIG. 11B are copy groups. A mark 601 shows a PVOL group of one or a plurality of PVOLs or a SVOL group of one or a plurality of SVOLs, and each of lines 603, 605, 607, and 609 represents a copy group. Specifically, the short lines 603 and 609 indicate a copy group of local copies, and the long lines 605 and 607 indicate a copy group of remote copies. More specifically, the short line 603 indicates a target of display (copy group) "CG-C", the long line 605 indicates a target of display (copy group) "CG-A", the long line 607 indicates a target of display (copy group) "CG-B", and the short line 609 indicates a target of display (copy group) "CG-D". The cascade forms of the copy group "CG-C" and the copy group "CG-A" can be detected by, for example, receiving, from the control program 75, the ID of each logical volume configuring the copy pairs "Pair-A", "Pair-B", "Pair-D" and "Pair-E" and the ID of the storage subsystem 31 comprising the logical volume, and determining whether the logical volume ID and the storage subsystem ID are the same, and the detected configurations can be displayed as shown in FIG. 14B (the above screen configuration is applied for FIG. 15A and FIG. 16A).

The storage monitoring program 63 displays, in the vicinity of each line, an icon representing the pair state corresponding to the target of display on the display copy pair state table 67. Here, the pair state is "normal" for all the targets for display, thus an icon 611 indicating "normal" pair state is displayed. The user can immediately understand that all copy pairs are in an expected state regardless of the type of copy, by looking at the screen shown in FIG. 14B.

(2) When the pair state for display of at last one copy pair is "warning".

Figure 15A:
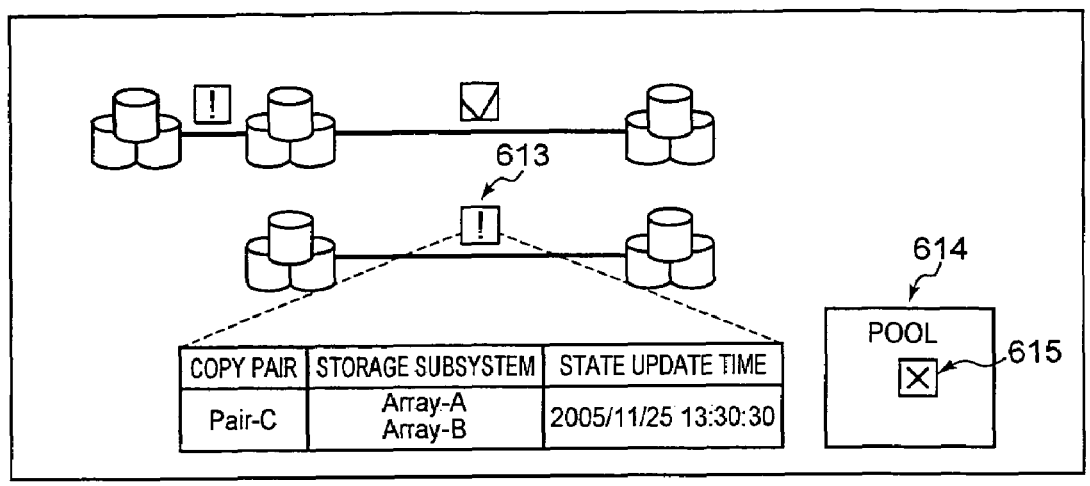
FIG. 15A shows a display example of the monitor screen 61 in the case where there exists a copy pair in the copy groups, which is determined as "warning", the copy groups being targets of monitoring.

FIG. 15A shows a display example of the monitor screen 61 in the case where there exists a copy pair in the copy groups, which is determined as "warning", the copy groups being targets of monitoring. FIG. 15A is a screen displayed on the basis of the display copy pair state table 67 shown in FIG. 11B. Specifically, the storage monitoring program 63 displays an icon 613 showing the pair state corresponding to "warning", in the vicinity of the lines corresponding respectively to the target of displays "CG-C" and "CG-B". Accordingly, the user can immediately understand the copy group having copy pairs which are not in the error state but may be brought into the involuntary state.

Moreover, in response to that the icon 613 representing "warning" is designated by the user (that the cursor of the mouse is caused to overlap on the icon 613 or that the icon 613 is clicked when the cursor overlaps thereon), the storage monitoring program 63 can display the detailed information (detailed information recorded on the display copy pair state table 67) of the target of display corresponding to the icon 613, on a pop-up. Specifically, the storage monitoring program 63 does not display the detailed information first, thereby creating a screen so as to have a nice panoramic view thereof, and then displays the detailed information in response to a request from the user. The pop-up may be deleted when a designation for deleting the pop-up is received from the user (for example, when the cursor is no longer allowed to overlap on the icon 613 or when the mouse is clicked). If there are a number of icons 613 representing "warning", a plurality of pop-ups may be displayed on a single monitor screen 61. In this case, the storage monitoring program 63 may display each of the pop-ups on a position which does not overlap with other pop-ups, or may display each pop-up by adjusting (reducing, for example) the size of the pop-up so as to avoid an overlap between the pop-ups.

It should be noted in the screen shown in FIG. 14B that, since the target of display of the copy group "CG-D" is "POOL-A" in FIG. 11B, the storage monitoring program 63 displays a mark 614, which represents a pool volume, instead of displaying the copy group "CG-D", and further displays an icon 615 representing "error" inside the mark 614 (or in the vicinity of the mark 614) since the pair state is "error".

(3) When the pair state for display of at least one copy Pair is "error".

Figure 15B:
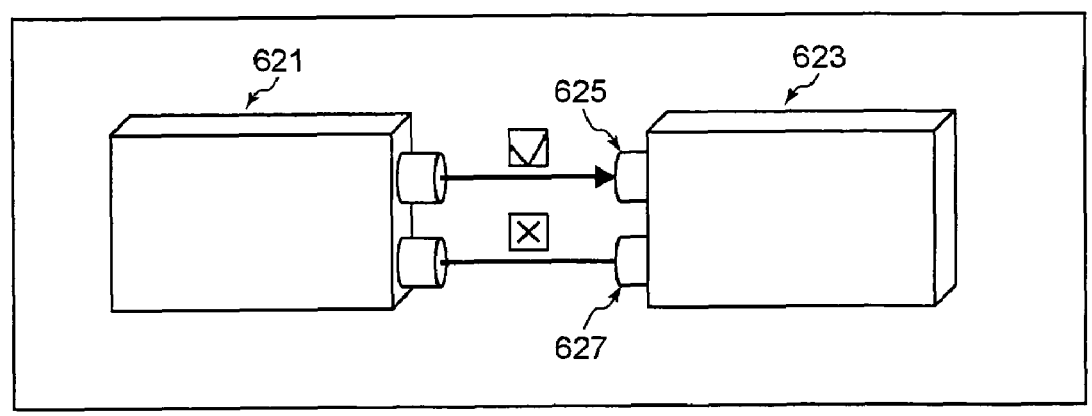
FIG. 15B shows a display example of the monitor screen 61 in the case where an error occurs at a communication port for performing remote copy.
Figure 15C:
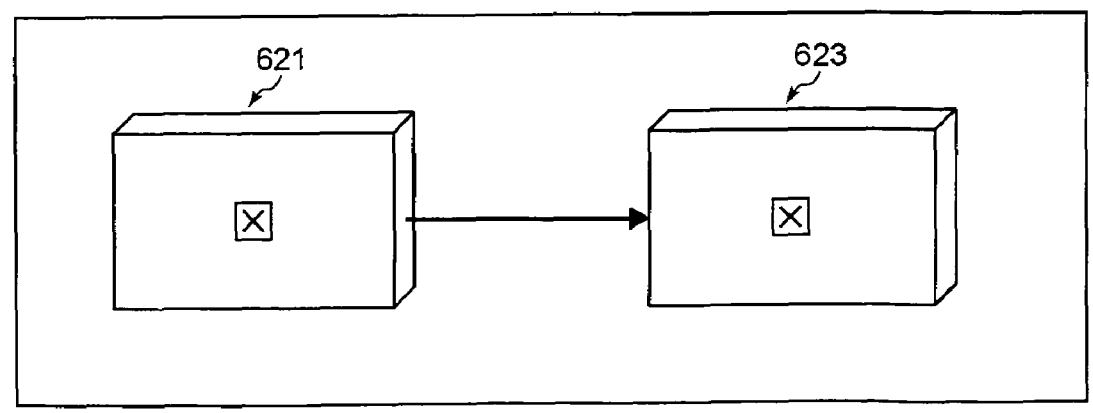
FIG. 15C shows a display example of the monitor screen 61 in the case where an error occurs at a storage subsystem 31.

Regarding a copy group as the target of monitoring, a display example of the monitor screen 61 in the case where an error occurs at a communication port for performing remote copy is shown in FIG. 15B, and a display example of the monitor screen 61 in the case where an error occurs at the storage subsystem 31 is shown in FIG. 15C. According to FIG. 15B and FIG. 15C, since the icons corresponding to the communication port and the storage subsystems indicate errors, the user can have a panoramic understanding of sections where error occur. This case is described in detail hereinafter.

In the display copy pair state table 67, in the case where the targets of display (aggregation scope) of the copy groups "CG-A" and "CG-B" are the communication ports and the pair state of target of display "CTL-A" is "normal" but the pair state of the target of display "CTL-B" is "error", the storage monitoring program 63 displays the screen shown in FIG. 15B. Specifically, since the aggregation scope is the communication ports, the storage monitoring program 63 displays, instead of the marks of the copy groups, a mark 621 representing a subsystem of "Array-A" and a mark 623 representing a subsystem of "Array-B", displays a mark 625 representing the communication port "CTL-A" and a mark 627 representing the communication port "CTL-B", displays lines showing that two subsystems are connected via the communication ports, and further displays an icon representing each pair state in the vicinity of each of the lines. At this moment, the line corresponding to a "normal" pair state is displayed by an arrow indicating that transfer is carried out, but the line corresponding to an "error" pair state is displayed simply as a line indicating that transfer is not carried out. By looking at the screen of FIG. 15B, since an error occurs at a communication port of one of the subsystems, the user can immediately recognize that all copy pairs belonging to the communication port are in the error state. It should be noted that when the target of display is "port" and the pair state of the target of display is the error state, such panoramic display is performed even when other port of the same storage subsystem is normal and the target of display is not "port". Therefore, the storage monitoring program 63 may change the target of display to "port". Alternatively, if other port is normal, the copy pairs belonging to this port may be displayed in accordance with the aggregation scope of the copy pairs.

In the display copy pair state table 67, when the target of display (aggregation scope) for the copy groups "CG-A" and "CG-B" is the storage subsystem and the pair states of the targets of display "Array-A" and "Array-B" are "error", the storage monitoring program 63 displays the screen shown in FIG. 15C. Specifically, since the aggregation scope is the storage subsystem, the storage monitoring program 63 displays, instead of the marks of the copy groups, the mark 621 representing the subsystem of "Array-A" and the mark 623 representing the subsystem of "Array-B", and further displays an icon corresponding to an "error" pair state inside or in the vicinity of each of the marks 621 and 623. By looking at the screen of FIG. 15C, since an error occurs at the both subsystems, the user can immediately recognize that all copy pairs belonging to each of the subsystems are in the error state.

Although not shown in particular, as in FIG. 15A, in FIG. 15B and FIG. 15C as well, the user can referred to the detailed information corresponding to the targets of display by designating the icons corresponding to the errors. Moreover, in the example of FIG. 15C, although a failure occurs in both local and remote storage subsystems, if a failure occurs in either one of the storage subsystems the icon representing the error is displayed only on the corresponding storage subsystem (4) When the pair state for display of at least one copy pair is "backup/restoration being executed".

Figure 16A:
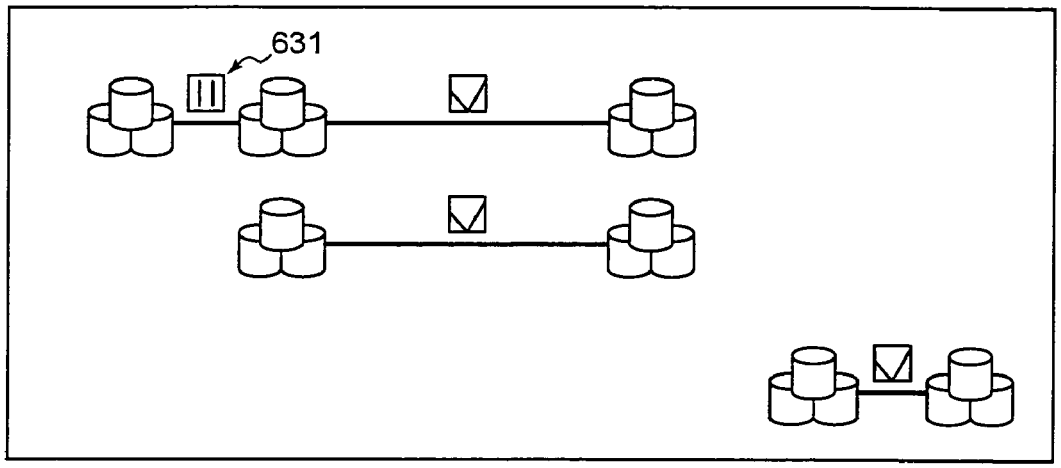
FIG. 16A shows a display example of the monitor screen 61 in the case where there exist a copy pair in the copy groups as the targets of monitoring, which is determined as "normal", and a copy pair determined as "backup/restoration being executed"

FIG. 16A shows a display example of the monitor screen 61 in the case where there exist a copy pair in the copy groups as the targets of monitoring, which is determined as "normal", and a copy pair determined as "backup/restoration being executed". Specifically, FIG. 16A shows an example of the case where the pair state of the target of display (copy group) "CG-C" indicates "backup/restoration being executed". The storage monitoring program 63 displays an icon 631, which indicates a pair state changed by an intentional operation of the user, in the vicinity of the line corresponding to the target of display "CG-C". According to FIG. 16A, the user can immediately recognize that a "normal" pair state of a copy group is the pair state changed by the intentional operation of the user. Whether such an operation is the backup/restore operation or the maintenance operation can be identified as change performed by the backup/restore operation, since the target of display indicates the copy group.

(5) When the maintenance work is being executed.

Figure 16B:
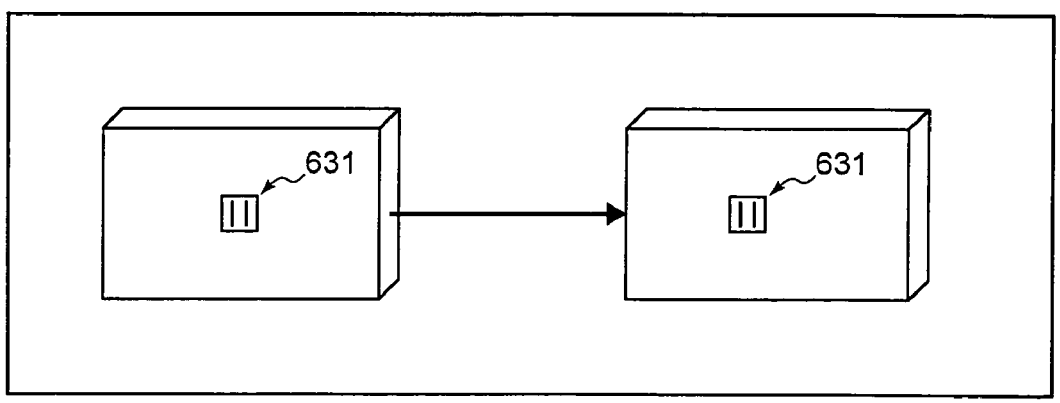
FIG. 16B shows a display example of the monitor screen 61 in the case where an operation mode of the storage subsystem having the copy groups, which are the targets of monitoring, is "under maintenance"
Figure 18A:
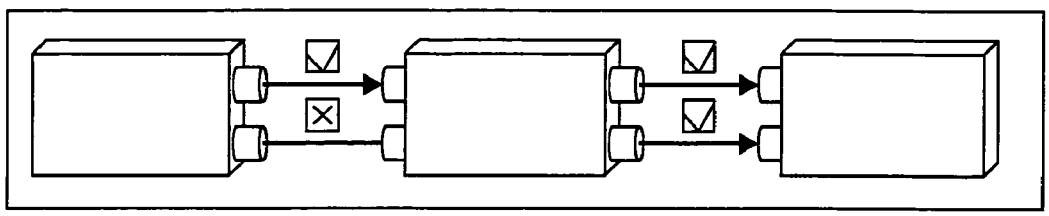
FIG. 18A shows a first display example of the monitor screen 61 in the case where data related to three or more storage subsystems is registered in the copy pair state table.
Figure 18B:
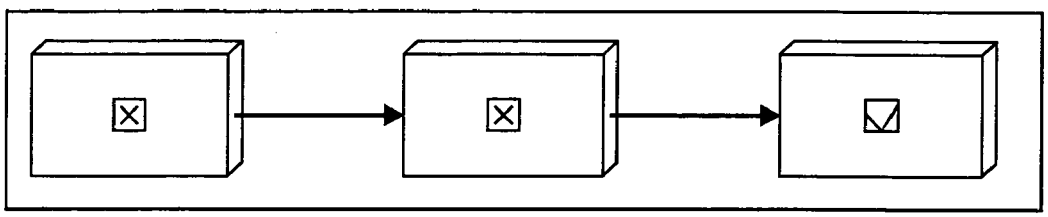
FIG. 18B shows a second display example of the monitor screen 61 in the above case.
Figure 18C:
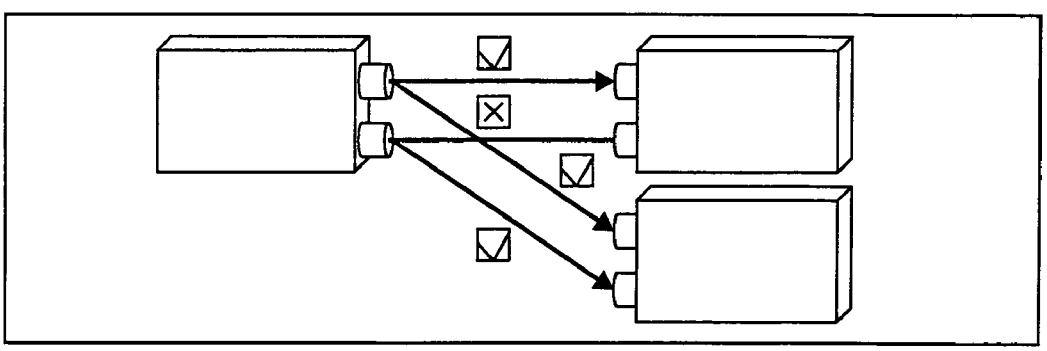
FIG. 18C shows third display example of the monitor screen 61 in the above case.
Figure 18D:
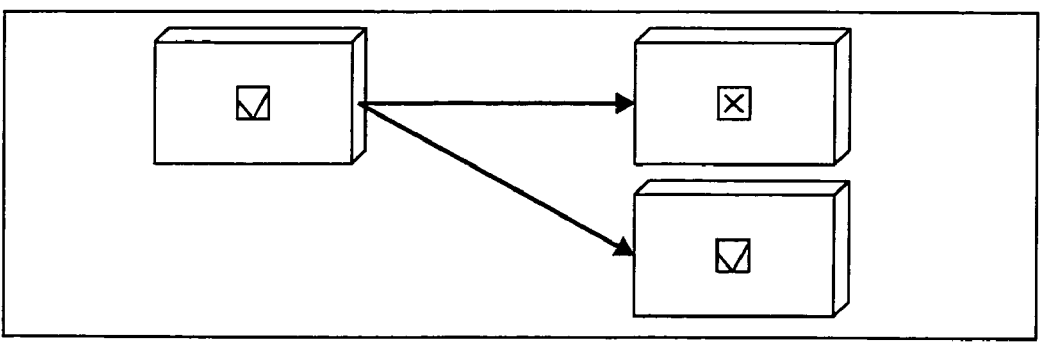
FIG. 18D shows a fourth display example of the monitor screen 61 in the above case.

FIG. 16B shows a display example of the monitor screen 61 in the case where an operation mode of the storage subsystem (for example, the subsystems "Array-A" and "Array-B") having the copy groups, which are the targets of monitoring, is "under maintenance". In this case, in the display copy pair state table 67, the IDs of the storage subsystems are written as the targets of display and "maintenance" is written as the pair states, thus the storage monitoring program 63 displays marks indicating the subsystems, and further displays, inside (or in the vicinity) of the marks, the icons 631 indicating that the pair state is a pair state changed by an intentional operation of the user, in accordance with the table 67. According to FIG. 16B, unlike FIG. 16A, the marks are displayed in units of the subsystem and the icons 631 are displayed inside the marks of the subsystems, whereby the user can immediately recognize that all copy pairs belonging to each of the subsystems are affected by the maintenance work. It should be noted in the example shown in FIG. 16B that, although the operation modes of the both local and remote storage subsystems 31 indicate "under maintenance", if only one of the storage subsystems 31 is under maintenance the icon of "under maintenance" is displayed only on the corresponding storage subsystem.

Although the above has described the embodiments of the present invention, the above descriptions are merely examples provided to describe the present invention and thus are not to restrict the scope of the present invention to these embodiments. The present invention can be implemented in various other embodiments.

For example, on the screen for displaying in units of the copy group or in units of the common storage resource, display may be performed so that a volume group configuring each copy group or subsystems having the common storage region can be specified easily. For example, a display region representing each subsystem may be prepared, and a mark representing the volume groups owned by the subsystem or a mark representing the common storage resource may be displayed inside the display region.

Moreover, for example, the storage monitoring program 63 may acquire information indicating a detailed copy type from the task server 11 or the storage subsystem 31, an display a mark representing the pair state and its detailed copy type. "Detailed copy type" is not merely a broad type such as a local copy or a remote copy, and thus may be displayed with a mark indicating, even in the case of the local copy, that a snapshot is acquired using a pool volume or an actual volume, or indicating, even in the case of the remote copy, whether a copy type is asynchronous remote copy using a side file, asynchronous remote copy using JNLVOL, or synchronous remote copy.

Furthermore, when the data related to three or more storage subsystems are registered in the table 65 shown in FIG. 12A through FIG. 14A and in the display copy pair state table 67 shown in FIG. 11B, display can be performed as shown in FIG. 18A through FIG. 18D. Specifically, for example, the monitoring server 51 can specify configurations of the three or more storage subsystems from the copy pair state table 65, and, on the basis of the specified configurations and the display copy pair state table 67, create and display at least one display screen of the display screens shown in FIG. 18A through FIG. 18D.

What is claimed is:

1. A method for displaying a state of a copy pair which is a pair of logical volumes belonging to one or a plurality of storage systems, comprising:

transmitting a user request, which is a request complying with a designated operation performed on a host computer by a user, to a storage system by the host computer, the designated operation being a backup/restore operation for backing up or restoring data inside a logical volume in which data used by the host computer is stored;

recording on a storage region of the storage system which receives the user request, user operation information acquired from the host computer, which is information related to the user request for the backup/restore operation, and changing in copy pair management information in which is recorded, for each copy pair, a subsystem pair state which is a pair state in the storage system, a subsystem pair state of a copy pair related to the user request to a subsystem pair state accompanied with the user request;

distinguishing, by comparing the user operation information with the copy pair management information after update, a user-operated copy pair, which is in the subsystem pair state changed in accompany with the user request complying with user operation performed intentionally by the user, from a user-unoperated copy pair which is not in the subsystem pair state;

displaying on a display device, on the basis of a result of the distinguishing, a pair state for display of the user-operated copy pair and a pair state for display of the user-unoperated copy pair in different display modes respectively;

associating, an information element representing one or a plurality of types of subsystem elements of the storage system with the undated copy pair management information for each copy pair:

acquiring error specifying information from the storage subsystem, for specifying an error occurrence area in the storage system, and detecting the error occurrence area in the storage system from the error specifying information; and specifying the user-unoperated copy pair, which is associated with the same subsystem element as the detected error occurrence area, from the undated copy pair management information, and displaying on the display device the pair states for display of one or more of the specified user-unoperated copy pair associated with the same error occurrence area, in units of the error occurrence area by changing a display format according to the unit of the error occurrence area.

2. The method for displaying a state of a copy pair according to claim 1, wherein
   the error occurrence area is a communication port existing on an access path to one of the user-unoperated copy pair or other logical volume;
   the method comprising:
   updating the subsystem pair state of the user-unoperated copy pair, which is associated with the communication port, to an error at the storage system having the communication port, by the occurrence of an error at the communication port; and
   associating a port display object, which is an object representing the communication port of the error occurrence area, and an error display object, which is an object representing the error, with each other and displaying the associated said port display object and said error display object.

3. The method for displaying a state of a copy pair according to claim 1, wherein
   the error occurrence area is a common storage resource which is used by the user-unoperated copy pair;
   the method comprising:
   updating a subsystem pair state of the user-unoperated copy pair, which is associated with the common storage resource, to an error at the storage system having the common storage resource, by the occurrence of an error at the common storage resource; and
   associating a common resource display object, which is an object representing the common storage resource of the error occurrence area, and an error display object, which is an object representing the error, with each other and displaying the associated said common resource display object and said error display object.

4. The method for displaying a state of a copy pair according to claim 1, wherein
   the error occurrence area is a specific hardware in the storage system other than the communication port existing on the access path to one of the user-unoperated copy pair or other logical volume;
   the method comprising:
   updating a subsystem pair state of the user-unoperated copy pair, which is associated with the storage system having the hardware, to an error at the storage system having the hardware, by the occurrence of an error at the hardware; and
   associating a subsystem display object, which is an object representing the storage system having the hardware of the error occurrence area, and an error display object, which is an object representing the error, with each other and displaying the associated said subsystem display object and said error display object.

5. The method for displaying a state of a copy pair according to claim 1, the method comprising:
   associating an error area display object, which is an object representing the error occurrence area, and an error display object, which is an object displaying an error, with each other and displaying the associated said error area display object and said error display object; and
   displaying, when the error display object is designated by the user, detailed information comprising at least one user-unoperated copy pairs associated with the error occurrence area, and the pair state for display and/or a subsystem pair state of each user-unoperated copy pair.

6. The method for displaying a state of a copy pair according to claim 1, wherein the pair state for display of the user-unoperated copy pair is determined on the basis of the subsystem pair state of the user-unoperated copy pair.

7. The method for displaying a state of a copy pair according to claim 6, the method comprising:
   determining, on the basis of the subsystem pair state of the user-unoperated copy pair and other type of information of the user-unoperated copy pair, the pair state for display as a normal state representing a state requiring no particular processing if the subsystem pair state is an expected subsystem pair state, whereas the pair state for display is determined as an error state representing a state in which an error occurs and which thus requires to be processed in any way if the subsystem pair state is an error; and determining, for the user-unoperated copy pairs in other conditions, the pair states for display as a warning state representing a state in which no error occurs but some processing needs to be performed.

8. The method for displaying a state of a copy pair according to claim 7, the method comprising:

associating a user-unoperated pair display object, which is an object related to the user-unoperated copy pair in which the pair state for display is determined as the warning state, and a warning display object, which is an object representing the warning state, with each other and displaying the associated said user-unoperated pair display object and the warning display object; and displaying, when the warning display object is designated by the user, detailed information related to the user-unoperated copy pair and specified from the updated copy pair management information.

9. A method for displaying a pair state of a copy pair which is a pair of logical volumes belonging to one or a plurality of storage systems, comprising:

transmitting a user request, which is a request complying with a designated operation performed on a host computer by a user, to a storage system by the host computer, the designed operation being a backup/restore operation for backing up or restoring data inside a logical volume in which data used by the host computer is stored;

recording on a storage region of the storage system which receives the user request, user operation information acquired from the host computer, which is information related to the user request for the backup/restore operation, and changing in copy pair management information in which is recorded, for each copy pair, a subsystem pair state which is a pair state in the storage system, a subsystem pair state of a copy pair related to the user request to a subsystem pair state accompanied with the user request, and the copy pair management information after update is associated with an information element representing one or a plurality of types of subsystem elements of the storage system, for each copy pair;

distinguishing, by using the user operation information and the copy pair management information after update, a user-operated copy pair, which is in the subsystem pair state changed in accompany with the user request complying with user operation performed intentionally by the user, from a user-unoperated copy pair which is not in the subsystem pair state;

determining the pair state for display of the user-operated copy pair as a user-operated state corresponding to the user operation, and setting an aggregation scope of the pair state for display;

acquiring error specifying information for specifying an error occurrence area in the storage system from the storage subsystems to detect the error occurrence area in the storage subsystems from the error specifying information;

specifying the user-unoperated copy pair, which is associated with the same subsystem element as the detected error occurrence area, from the updated copy pair management information, and setting the aggregation scope of the pair states for display of one or more of the specified user-unoperated copy pairs associated with the same error occurrence area to the error occurrence area;

determining, on the basis of the subsystem pair state of the user-unoperated copy pair and other type of information of the user-unoperated copy pair specified from the copy pair management information, the pair state for display as a normal state representing a state requiring no particular processing if the subsystem pair state is an expected subsystem pair state;

determining the pair state for display as an error state representing a state in which an error occurs and which thus requires to be processed in any way if the subsystem pair state is an error;

determining, for the copy pairs in other conditions, the pair states for display as a warning state representing a state in which no error occurs but some processing needs to be performed;

associating an object related to the set aggregation scope and an object representing the pair state for display of a copy pair belonging to the aggregation scope with each other and displaying the associated said object related to the set aggregation scope and said object representing the pair state for display;

displaying, when the pair states for display of a plurality of copy pairs belonging to a single aggregation scope are different, an object representing a pair state for display that matches a predetermined condition;

displaying on a display device, when the displayed object is an object corresponding to the error state or warning state, in the case where the object is designated by the user, detailed information of the aggregation scope, which is associated with the object and specified from the copy pair management information;

associating, an information element representing one or a plurality of types of subsystem elements of the storage system with the undated copy pair management information for each copy pair;

acquiring error specifying information from the storage subsystem, for specifying an error occurrence area in the storage system, and detecting the error occurrence area in the storage system from the error specifying information; and specifying the user-unoperated copy pair, which is associated with the same subsystem element as the detected error occurrence area, from the undated copy pair management information, and displaying on the display device the pair states for display of one or more of the specified user-unoperated copy pair associated with the same error occurrence area, in units of the error occurrence area by changing a display format according to the unit of the error occurrence area.

10. A method for displaying a state of a copy pair which is a pair of logical volumes belonging to one or a plurality of storage systems, comprising:

transmitting a user request, which is a request complying with a designated operation performed on a host computer by a user, to a storage system by the host computer, the designated operation being a backup/restore operation for backing up or restoring data inside a logical volume in which data used by the host computer is stored;

recording on a storage region of the storage system which receives the user request, user operation information acquired from the host computer, which is information related to the user request for the backup/restore operation, and changing in copy pair management information in which is recorded, for each copy pair, a subsystem pair state which is a pair state in the storage system, a subsystem pair state of a copy pair related to the user request to a subsystem pair state accompanied with the user request;

distinguishing, by comparing the user operation information with the copy pair management information after update, a user-operated copy pair, which is in the subsystem pair state changed in accompany with the user request complying with user operation performed intentionally by the user, from a user-unoperated copy pair which is not in the subsystem pair state;

displaying on a display device, on the basis of a result of the distinguishing, differing iconic representations symbolizing a pair state for display of the user-operated copy pair and a pair state for display of the user-unoperated copy pair, respectively;

associating, an information element representing one or a plurality of types of subsystem elements of the storage system with the updated copy pair management information for each copy pair;

acquiring error specifying information from the storage subsystem, for specifying an error occurrence area in the storage system, and detecting the error occurrence area in the storage system from the error specifying information; and determining the user-unoperated copy pair, which is associated with the same subsystem element as the detected error occurrence area, from the updated copy pair management information, and displaying on the display device the pair states for display of one or more of the specified user-unoperated copy pair associated with the same error occurrence area, in units of the error occurrence area, by changing the iconic representation according to the unit of the error occurrence area.

* * * * *